US012328020B2

(12) United States Patent
Chen

(10) Patent No.: US 12,328,020 B2
(45) Date of Patent: Jun. 10, 2025

(54) SYSTEM FOR SWAPPABLE BATTERY MODULE CHARGING AND DISCHARGING

(71) Applicant: Entrantech Inc., Gilroy, CA (US)

(72) Inventor: Kong-Chen Chen, Gilroy, CA (US)

(73) Assignee: ENTRANTECH INC., Gilroy, CA (US)

( * ) Notice: Subject to any disclaimer, the term of this patent is extended or adjusted under 35 U.S.C. 154(b) by 0 days.

(21) Appl. No.: 18/217,982

(22) Filed: Jul. 3, 2023

(65) Prior Publication Data

US 2023/0352947 A1    Nov. 2, 2023

Related U.S. Application Data

(63) Continuation-in-part of application No. 18/099,890, filed on Jan. 20, 2023, which is a continuation of
(Continued)

(51) Int. Cl.
*H02J 7/00* (2006.01)
*B60L 53/80* (2019.01)
(Continued)

(52) U.S. Cl.
CPC ............ *H02J 7/0025* (2020.01); *B60L 53/80* (2019.02); *H02J 7/00304* (2020.01);
(Continued)

(58) Field of Classification Search
CPC .................................................... H02J 7/0025
(Continued)

(56) References Cited

U.S. PATENT DOCUMENTS

| 5,786,642 A | 7/1998 | Wilhelm |
| 6,320,359 B1 | 11/2001 | Nagaya et al. |

(Continued)

FOREIGN PATENT DOCUMENTS

| CN | 110249475 B | 7/2022 |
| TW | 1451656 B | 9/2014 |

(Continued)

OTHER PUBLICATIONS

TW Office Action dated Aug. 29, 2024 in TW Application No. 113101506 with English translation.
(Continued)

*Primary Examiner* — Joseph Chang
(74) *Attorney, Agent, or Firm* — Ardeshir Tabibi; Weaver Austin Villeneuve & Sampson LLP

(57) ABSTRACT

An energy storage system comprises a set of swappable battery modules positioned in battery slots with a battery module being controlled by a control switch. The control switches are linkable to form a charging control chain and/or a discharging control chain respectively to control sequential charging/discharging, parallel charging/discharging, and segmented charging/discharging among the set of battery modules in the energy storage system. Methods to detect defective battery module in a battery slot are also presented. The energy storage system can be configured in an AC power distribution environment, a DC power distribution environment, or in an EV. The energy storage system is scalable, automatically reconfigurable and accepts AC power and regenerated DC power.

30 Claims, 12 Drawing Sheets

Related U.S. Application Data application No. 17/884,984, filed on Aug. 10, 2022, now Pat. No. 11,777,323, which is a continuation of application No. 17/402,435, filed on Aug. 13, 2021, now Pat. No. 11,837,968, and a continuation of application No. 17/398,355, filed on Aug. 10, 2021, now Pat. No. 11,489,455.

(60) Provisional application No. 63/471,978, filed on Jun. 9, 2023, provisional application No. 63/424,859, filed on Nov. 11, 2022, provisional application No. 63/356,484, filed on Jun. 29, 2022, provisional application No. 63/065,341, filed on Aug. 13, 2020.

(51) Int. Cl.
*H02M 1/00* (2006.01)
*H02M 7/25* (2006.01)

(52) U.S. Cl.
CPC ...... *H02J 7/00308* (2020.01); *H02J 7/00309* (2020.01); *H02M 1/0029* (2021.05); *H02M 7/25* (2013.01)

(58) Field of Classification Search
USPC .......................................... 320/116
See application file for complete search history.

(56) References Cited

U.S. PATENT DOCUMENTS

| | | | |
|---|---|---|---|
| 6,498,457 B1* | 12/2002 | Tsuboi | H01M 10/46 320/110 |
| 6,798,666 B1 | 9/2004 | Alexander et al. | |
| 8,148,844 B2 | 4/2012 | Pan | |
| 10,840,735 B1 | 11/2020 | Cooper | |
| 11,183,851 B1 | 11/2021 | Chen | |
| 11,476,657 B2 | 10/2022 | Chen | |
| 11,489,455 B2 | 11/2022 | Chen | |
| 11,605,970 B2 | 3/2023 | Chen | |
| 11,777,323 B2 | 10/2023 | Chen | |
| 11,837,968 B2 | 12/2023 | Chen | |
| 2004/0085043 A1 | 5/2004 | Germagian et al. | |
| 2005/0225955 A1 | 10/2005 | Grebenkemper et al. | |
| 2005/0237724 A1 | 10/2005 | Fiorentino et al. | |
| 2006/0244620 A1 | 11/2006 | Sotiriou | |
| 2011/0053394 A1 | 3/2011 | Hood, III et al. | |
| 2012/0118602 A1 | 5/2012 | Remmert | |
| 2013/0015714 A1 | 1/2013 | Kwok | |
| 2014/0184159 A1 | 7/2014 | Kachi | |
| 2015/0022001 A1 | 1/2015 | Goei et al. | |
| 2015/0048767 A1 | 2/2015 | Takezawa | |
| 2015/0054343 A1 | 2/2015 | Cui | |
| 2015/0348733 A1 | 12/2015 | Shi et al. | |
| 2016/0028230 A1 | 1/2016 | Elfman | |
| 2018/0212420 A1 | 7/2018 | Chen | |
| 2018/0226797 A1 | 8/2018 | Galin et al. | |
| 2018/0375435 A1 | 12/2018 | Muhoberac et al. | |
| 2019/0081571 A1 | 3/2019 | Chung et al. | |
| 2019/0229546 A1 | 7/2019 | Hartl | |
| 2019/0288532 A1 | 9/2019 | Mattos et al. | |
| 2020/0175551 A1* | 6/2020 | Penilla | B60L 53/80 |
| 2020/0381917 A1 | 12/2020 | Takeda | |
| 2022/0014014 A1 | 1/2022 | Chen | |
| 2022/0052618 A1 | 2/2022 | Chen | |
| 2022/0052619 A1 | 2/2022 | Chen | |
| 2022/0158482 A1 | 5/2022 | Chen | |
| 2022/0340039 A1 | 10/2022 | Unagami et al. | |
| 2022/0393488 A1 | 12/2022 | Chen | |
| 2023/0155397 A1 | 5/2023 | Chen | |
| 2023/0155398 A1 | 5/2023 | Chen | |
| 2023/0155401 A1* | 5/2023 | Kuranuki | H01G 11/08 |
| 2023/0352947 A1 | 11/2023 | Chen | |

FOREIGN PATENT DOCUMENTS

| | | |
|---|---|---|
| TW | 1460960 B | 11/2014 |
| TW | 202213896 A | 4/2022 |

OTHER PUBLICATIONS

U.S. Corrected Notice of Allowance dated Dec. 20, 2024 in U.S. Appl. No. 18/099,890.
U.S. Final Office Action dated Dec. 17, 2024 in U.S. Appl. No. 18/099,895.
U.S. Final Office Action dated Jul. 22, 2024 in U.S. Appl. No. 18/099,890.
U.S. Final Office Action dated Oct. 17, 2024 in U.S. Appl. No. 18/099,890.
U.S. Non-Final Office Action dated Apr. 3, 2024 in U.S. Appl. No. 18/099,890.
U.S. Non-Final Office Action dated Oct. 30, 2024 in U.S. Appl. No. 18/099,895.
U.S. Notice of Allowance dated Apr. 11, 2024 in U.S. Appl. No. 18/099,895.
U.S. Notice of Allowance dated Dec. 17, 2024 in U.S. Appl. No. 18/099,890.
U.S. Notice of Allowance dated Jul. 22, 2024 in U.S. Appl. No. 18/099,895.
International Preliminary Report on Patentability dated Jun. 1, 2023, in Application No. PCT/US2021/059792.
International Search Report & Written Opinion dated May 3, 2022 (ISA/US) in PCT Application PCT/US2021/059792.
U.S. Advisory Action dated Mar. 22, 2023 in U.S. Appl. No. 17/402,435.
U.S. Corrected Notice of Allowance dated Feb. 14, 2023 in U.S. Appl. No. 17/667,457.
U.S. Corrected Notice of Allowance dated Jul. 18, 2022 in U.S. Appl. No. 17/398,355.
U.S. Corrected Notice of Allowance dated Jun. 21, 2022 in U.S. Appl. No. 16/950,882.
U.S. Corrected Notice of Allowance dated Nov. 17, 2022 in U.S. Appl. No. 17/667,457.
U.S. Corrected Notice of Allowance dated Oct. 6, 2022 in U.S. Appl. No. 17/398,355.
U.S. Corrected Notice of Allowance dated Sep. 20, 2022 in U.S. Appl. No. 16/950,882.
U.S. Final office Action dated Jan. 19, 2023 in U.S. Appl. No. 17/402,435.
U.S. Non-Final office Action dated Aug. 24, 2022 in U.S. Appl. No. 17/402,435.
U.S. Notice of Allowance dated Apr. 19, 2023 in U.S. Appl. No. 17/884,984.
U.S. Notice of Allowance dated Aug. 10, 2023 in U.S. Appl. No. 17/884,984.
U.S. Notice of Allowance dated Feb. 15, 2022 in U.S. Appl. No. 16/950,882.
U.S. Notice of Allowance dated Jul. 5, 2023 in U.S. Appl. No. 17/402,435.
U.S. Notice of Allowance dated Jul. 7, 2022 in U.S. Appl. No. 17/398,355.
U.S. Notice of Allowance dated Jul. 27, 2021 in U.S. Appl. No. 17/062,413.
U.S. Notice of Allowance dated Jun. 9, 2022 in U.S. Appl. No. 16/950,882.
U.S. Notice of Allowance dated May 11, 2023 in U.S. Appl. No. 17/884,984.
U.S. Notice of Allowance dated Nov. 3, 2022 in U.S. Appl. No. 17/667,457.
U.S. Notice of Allowance dated Nov. 3, 2023 in U.S. Appl. No. 17/402,435.
U.S. Non-Final Office Action dated Mar. 31, 2025 in U.S. Appl. No. 18/099,895.

(56) References Cited

OTHER PUBLICATIONS

U.S. Notice of Allowance dated Mar. 26, 2025 in U.S. Appl. No. 18/099,890.

* cited by examiner

SYSTEM FOR SWAPPABLE BATTERY MODULE CHARGING AND DISCHARGING

CROSS REFERENCE TO RELATED APPLICATIONS

The present application claims priority, under U.S.C. § 119, from U.S. Provisional Application No. 63/471,978, filed on Jun. 9, 2023, entitled "System for Swappable Battery Module Charging and Discharging", the content of which is incorporated herein by reference in its entirety. The present application is:
- a continuation-in-part of U.S. application Ser. No. 18/099,890, filed on Jan. 20, 2023, entitled "Charging and Discharging Control of Energy Devices in a Power System";
- a continuation-in part of application Ser. No. 17/884,984, filed on Aug. 10, 2022, entitled "Sequential Power Discharge for Batteries in a Power System"; and
- a continuation-in part of application Ser. No. 17/402,435, filed on Aug. 13, 2021, entitled "Apparatus and Method for Persistent DC Power Panel Conversion", the contents of all which applications are incorporated herein by referred in their entirety.

FIELD OF THE INVENTION

The present invention relates to a scalable method and system for charging and discharging of a multitude of swappable battery modules.

BACKGROUND

An electric vehicle (EV) typically uses a large battery pack for the vehicle. It takes time to charge the entire battery pack when its energy is depleted. Challenges are often encountered in the charging of a battery pack, such as the availability of fast chargers on the road, lack of in-house chargers for apartment residents, and the like. In addition, a large battery pack may not be energy efficient for short distance commuters due to the excessive weight of battery pack carried by the EV when driving around.

There are various solutions to resolve the challenges of battery pack charging, such as installing more higher power chargers in more areas to meet the needs of EV drivers, or building a battery pack swapping station, which removes the energy depleted battery pack from EV and replaces with a fully charged one. Building such a battery pack swapping facility, and storing and charging of depleted battery packs at the swapping facility also require substantial endeavors.

Using swappable battery is a common application, such as rechargeable batteries used in flash lights or consumer electronics. A recent application is to use rechargeable, swappable batteries for electric vehicles. For example, the GoStation from GOGORO is a battery swap station (BSS) or a battery swap kiosk, which provides battery swappable service for e-scooters. The GoStation enables riders to pull the depleted battery modules from their e-scooters and to replace them with charged batteries. In GoStation, when a depleted battery module is put into an empty slot on the kiosk, it triggers a controller or computer in the GoStation to check which swappable battery has the most energy for riders to replace. There is no indicator about the energy status of the swappable battery at the GoStation. Instead, the one with the most energy is selected and popped out by the controller for the rider to replace.

Another example, such as the DJI Matrice 300 BS60 Intelligent Battery Station, it is used to charge eight flight batteries and two remote control batteries, where two flight batteries and one remote control battery may be charged at the same time. An internal control mechanism determines which two flight batteries and which remote control battery that have the most power will be charged first to minimize battery replacement wait time. The station uses USB Type-C connection for firmware update.

The existing swappable battery charging methods either directly apply power to all batteries in the charging station/system without in-situ control, or use a controller or computer with control software/firmware for the charging control and the monitoring of energy status of the swappable batteries. Such control software/firmware is more flexible, but is more complicated to configure and to manage, and makes the charging stations more vulnerable to malware or ransomware attacks.

SUMMARY

A battery system, in accordance with one embodiment of the present disclosure, is partitioned into a multitude of smaller, removable battery modules. Each battery module is controlled by a control switch, which is linkable with control switches associated with other battery modules in the battery system to form a sequential charging control chain and/or a sequential discharging control chain to control the sequential charging and/or sequential discharging of the multitude of battery modules. The battery system may also provide parallel charging and/or parallel discharging function of the battery modules.

In one embodiment, the battery system may be a battery pack in an electric vehicle. In another embodiment, the battery system may be an energy storage system in a DC-centric or an AC and DC combined power environment. The removable battery modules used in, for example, an electric vehicle may be swapped with the battery modules used in the energy storage system in a building or at home. In addition, the energy depleted removable battery modules in an electric vehicle may be swapped with the fully charged battery modules in a battery service station when a fast charger is unavailable. The sequential charging and discharging capability for the multitude of battery modules in the battery system provides many advantages for the battery pack in an electric vehicle and for the energy storage system at home. The charging and discharging for the multitude of battery modules may be segmented to adjust the charging rate and to adjust the output voltage and/or current of the battery system. Another aspect of the present disclosure provides defect detection circuits for identifying defective battery modules in a sequential charging control chain.

A system, in accordance with one embodiment of the present application is configured to charge a multitude of battery modules disposed in a multitude of battery slots. One of the battery slots includes, in part, a receptacle adapted to receive and hold a battery module; a detector adapted to detect a presence of the battery module at an associated receptacle; and a charging control unit. The charging control unit includes, in part, a charging comparator adapted to monitor an energy level of the associated battery module; a charging input enable signal to enable a charging demultiplexer disposed in the charging control unit; and a charging-enable output signal generated by the charging demultiplexer, wherein the charging demultiplexer. The charging demultiplexer is adapted to activate a transfer device disposed in the system to transfer energy from a DC power source to charge the battery module when the energy level detected by the charging comparator is below a charging reference voltage, and to assert the charging-enable output signal to activate a charging control unit at a succeeding battery slot when the energy level detected by the charging comparator reaches the charging reference voltage.

In one embodiment, the charging reference voltage is an attenuated voltage derived from an output of the battery module. In one embodiment, the charging control unit and the transfer device form a charging control switch. In one embodiment, the charging-enable output signal of a $(k-1)^{th}$ charging control unit associated with the $(k-1)^{th}$ battery slot and the charging input enable signal of a $k^{th}$ charging control unit associated with the $k^{th}$ battery slots are linked to form a sequential charging control chain in the system, wherein k is an integer greater than or equal to 2, and wherein the $(k-1)^{th}$ charging control unit has a higher priority to perform charging than the $k^{th}$ charging control unit in the sequential charging control chain.

In one embodiment, the sequential charging control chain controls charging of the multitude of battery modules sequentially in accordance with a linking sequence of the charging control units forming the charging control chain associated with the multitude of battery slots. In one embodiment, the sequential charging control chain performs charging of the multitude of battery modules whose energy levels are below the charging reference voltage automatically when the sequential charging control chain is enabled.

In one embodiment, the system is adaptive to reconfigure the charging control chain automatically on a rearrangement of the multitude of battery slots, including one or more of: re-ordering the linking sequence of the plurality of battery slots; increasing a number of the plurality of battery slots; and reducing the number of the battery slots.

In one embodiment, parallel charging enable signal is ORed with the charging input enable signal to generate a combined signal adapted to enable the charging demultiplexer in the charging control unit. In one embodiment, the parallel charging enable signal is adapted to enable one or more charging control units associated with the multitude of battery slots to charge battery modules disposed in one or more battery slots in parallel, wherein the DC power source is distributed to one or more charging control units.

In one embodiment, the charging control chain is partitioned into one or more charging segments, wherein a segment charging input enable signal is applied to the charging input enable terminal of the charging control units in a charging segment in parallel; and wherein a segment charging-enable output signal is generated by ANDing the charging-enable output signals of the charging control units in the charging segment to enable a succeeding charging segment in the charging control chain of the system.

In one embodiment, a battery slot further includes, in part, a discharging control unit. Such discharging control unit includes, in part, a discharging comparator to monitor the energy level of the associated battery module; a discharging input enable signal adapted to enable a discharging demultiplexer disposed in the discharging control unit; and a discharging-enable output signal generated by the discharging demultiplexer. In such embodiments, when the discharging input enable signal is asserted the discharging demultiplexer is adapted to: activate closure of a normally-open switch coupled to an output of the battery module to deliver energy for external use, when the discharging comparator detects energy level in the battery module reaches a discharging reference voltage; and assert the discharging-enable output signal to activate a discharging control of a succeeding battery slot, when the discharging comparator detects energy level in the battery module is below the discharging reference voltage.

In one embodiment, the discharging reference voltage is an attenuated voltage derived from an output of the battery module. In one embodiment, the charging reference voltage is higher than the discharging reference voltage. In one embodiment, the discharging control and the transfer device form a discharging control switch. In one embodiment, the charging control unit, the discharging control unit and the transfer device form a charging and discharging control switch.

In one embodiment, the discharging-enable output signal of the $(k-1)^{th}$ discharging control unit associated with the $(k-1)^{th}$ battery slot and the discharging input enable signal of the $k^{th}$ discharging control unit associated with the $k^{th}$ battery slot are linked to form a sequential discharging control chain in the system, wherein k is an integer greater than or equal to 2. In such embodiments, a preceding discharging control unit has a higher priority to discharge a battery module designated as a higher priority than a succeeding discharging control unit to discharge a battery module designated as a lower priority in the sequential discharging control chain.

In one embodiment, the sequential discharging control chain controls discharging of the multitude of battery modules sequentially in accordance with a linking sequence of the discharging control units to form the discharging control chain associated with the multitude of battery slots. In one embodiment, the sequential discharging control chain discharges the battery modules whose energy levels are above the discharging reference voltage automatically, when the discharging control chain is enabled. In one embodiment, the system is adaptive to reconfigure the discharging control chain automatically on a rearrangement of the battery slots in the system, including one or more of: re-ordering the linking sequence of the multitude of battery slots; increasing a number of the multitude of battery slots; and reducing a number of the multitude of battery slots.

In one embodiment, a parallel discharging enable signal is ORed with the discharging input enable signal to generate a combined signal adapted to enable the discharging demultiplexer in the discharging control unit. In one embodiment, the assertion of the parallel discharging enable signal enables one or more discharging control units associated with the multitude of battery slots to discharge energy from the battery modules disposed in the battery slots in parallel. Discharging more than one battery modules in parallel increases the output energy of the system.

In one embodiment, the discharging control chain is partitioned into one or more discharging segments. In such embodiments, a segment discharging input enable signal is applied to the discharging input enable terminal of the discharging control units in a discharging segment in parallel; and a segment discharging-enable output signal is generated by ANDing the discharging-enable output signals of the discharging control units in the discharging segment to enable a succeeding discharging segment in the discharging control chain of the system.

A circuit adapted to detect whether a battery module placed in a battery slot controlled by a charging control switch of a sequential charging control chain is defective, includes, in part, a down-counter; and a Set/Reset Flip-Flop (SRFF). When the battery module is placed in the battery slot, an output of a direct contact switch coupled to the battery slot is negated. Furthermore, at the assertion of a charging input enable signal applied to the charging control switch and when a charging-enable output signal being generated by the charging control switch for inputting to a successive charging control switch in the sequential charging control chain is de-asserted, a pre-set value is loaded into the down-counter and causes the down-counter to start decrementing the down-counter's count at each clock pulse. When the down-counter counts down to zero, the SRFF is set, and when the charging-enable output signal is asserted, the down-counter stops counting before reaching zero.

In one embodiment, the battery module is detected as being defective if the SRFF is set; and the battery module is not detected as being defective if the charging-enable output signal is asserted before the down-counter counts down to zero. In one embodiment, the pre-set value is programmable based on the energy capacity of the battery module and an amount of the power of an external DC power source used to charge the battery module. In one embodiment, a status of the battery module detected as being defective is observable by detecting an output of the SRFF.

In one embodiment, when the battery module is detected as being defective, setting the SRFF inhibits the charging control switch and asserts a charging-enable output signal to a succeeding charging control switch to proceed with the battery charging. In one embodiment, by removing the battery module from the battery slot, the output of the direct contact switch is asserted to reset the SRFF.

A circuit adapted to detect a battery module placed in a battery slot controlled by a charging control switch of a sequential charging control chain, includes, in part, an up-counter; a comparator; and a Set/Reset Flip-Flop (SRFF). When the battery module is placed in the battery slot, an output of a direct contact switch coupled to the battery slot is negated. At the assertion of a charging input enable signal applied to the charging control switch and when a charging-enable output signal being generated by the charging control switch for inputting to a successive charging control switch in the sequential charging control chain is de-asserted, the up-counter is enabled to increment the up-counter's count in response to each transition of a clock signal. When the up-counter reaches a pre-set value as detected by the comparator, the SRFF is set. When the charging-enable output signal is asserted, the up-counter stops counting before reaching the pre-set value.

In one embodiment, the battery module is detected as being defective if the SRFF is set; and the battery module is detected as not being defective if the charging-enable output signal is asserted before the up-counter reaches the pre-set value. In one embodiment, the pre-set value is programable based on the energy capacity of the battery module and the amount of power of an external DC power source used to charge the battery module.

In one embodiment, a status of a defective battery module is observable by detecting an output of the SRFF. In one embodiment, when the battery module is detected as being defective, setting the SRFF (i) inhibits the charging control switch to assert a charging-enable output signal to the successive charging control switch to proceed with battery charging and (ii) clears the up-counter. In one embodiment, by removing the battery module from the battery slot, the output of the direct contact switch is asserted to reset the SRFF.

A circuit, in accordance with one embodiment of the present disclosure and adapted to detect abnormality in a charging control switch coupled to a battery module in a battery slot, performs an AND function of the following inputs: (i) inversion of an output of a direct contact switch coupled to the battery slot, when battery module is not in the battery slot, the direct contact switch outputs a low value; (ii) inversion of an energy status of the battery module monitored by a comparator disposed in the charging control switch, wherein when an abnormal event takes place, the battery module charging terminates and the comparator is saturated to a logic low when an attenuated energy derived from the battery module and monitored by the comparator is below a reference voltage; (iii) inversion of an output of a detection circuit adapted to detect a defect in the battery module to indicate no defect being detected; and (iv) assertion of a charging-enable output signal from the charging control switch.

A circuit is adapted to detect one or more abnormalities in a control switch by ORing the one or more abnormalities including at least one of over-temperature, over-current, short circuit, and over-voltage of external power input, wherein an ORed output is observable at a pin of the control switch.

An AC power configuration, in accordance with one embodiment of the present disclosure, includes, in part: an AC power panel that includes a multitude of circuit breakers adapted to control an AC power distribution for a multitude of AC power distribution circuits coupled to the AC power panel; and a battery charging system that includes a multitude of battery slots for adopting a multitude of swappable battery modules controlled by a multitude of charging control switches disposed in the battery charging system. A first charging control switch of the multitude of charging control switches is coupled to a first swappable battery module in the multitude of swappable battery modules; a charging-enable output signal of the $(k-1)^{th}$ charging control switch of the multitude of the charging control switches is coupled to a charging input enable signal of the $k^{th}$ charging control switch of the multitude of charging control switches to form a sequential charging control chain to control charging of the multitude of swappable battery modules sequentially, when the battery charging system is enabled, wherein k is an integer greater than or equal to 2.

In one embodiment, the battery charging system receives DC power input selected from one or more of a persistent DC power module or a regenerated DC power source. In one embodiment, a discharging control switch is further coupled to a swappable battery module in the battery slot to form a battery charging and discharging system, wherein a discharging-enable output signal of the discharging control switch coupled to the swappable battery module associated with the $(k-1)^{th}$ charging control switch and the discharging input enable signal of the discharging control switch coupled to the battery module associated with the $k^{th}$ charging control switch are linked to form a discharging control chain to control discharging of the multitude of swappable battery modules sequentially, when the battery discharging system is enabled.

In one embodiment, the AC power configuration further includes, in part, a DC-AC inverter coupled to the output of the charging and discharging system, wherein the DC-AC inverter is adapted to generate an inverted AC power to the AC power panel during an AC power outage. In one embodiment, each of the swappable battery modules is swappable with a battery nodule of an electric vehicle.

A DC power configuration, in accordance with one embodiment of the present disclosure, includes, in part, a DC power panel that includes a multitude of circuit breakers adapted to control DC power distribution for a multitude of DC power distribution circuits coupled to the DC power panel; and a battery charging and discharging system that includes a multitude of battery slots for receiving and holding a multitude of swappable battery modules controlled by a multitude of charging and discharging control switches disposed in the battery charging and discharging system, wherein each battery slot includes a charging and discharging control switch adapted to be coupled to a swappable battery module when the battery module is placed in the battery slot. In such embodiments, a charging-enable output signal of the $(k-1)^{th}$ charging and discharging control switch of the multitude of the charging and discharging control switches is coupled to a charging input enable signal of the $k^{th}$ charging and discharging control switch of the multitude of charging and discharging control switches to form a charging control chain adapted to control charging of the multitude of swappable battery modules sequentially when the charging control chain is enabled, wherein k is an integer greater than or equal to 2. Furthermore, in such embodiments, a discharging-enable output signal of a $(k-1)^{th}$ charging and discharging control switch of the multitude of the charging and discharging control switches is coupled to a discharging input enable signal of the $k^{th}$ charging and discharging control switch of the multitude of charging and discharging control switches to form a discharging control chain to control discharging of the multitude of swappable battery modules sequentially, when the discharging control chain is enabled. Such embodiments further include, in part, a DC-DC converter adapted to convert a DC power input into (i) a panel voltage for powering the DC power panel and (ii) a battery voltage for charging the battery charging and discharging system; and a voltage detector to detect the panel voltage, wherein when an attenuated panel voltage detected by the voltage detector reaches a reference voltage, a panel enable signal is asserted to enable the panel voltage to input to the DC power panel, and when the attenuated panel voltage detected by the voltage detector is below the reference voltage, the output of a DC-DC regulator which converts a voltage output from the charging and discharging battery system to the panel voltage is input to the DC power panel.

In one embodiment of the DC power configuration, a discharging enable signal is asserted to enable the battery charging and discharging system to output power for the DC-DC regulator to generate the panel voltage in advance.

A battery charging apparatus, in accordance with one aspect of the present disclosure is incorporated in a battery pack of an electric vehicle. The battery pack includes, in part, a multitude of battery modules. A first one of the multitude of battery modules is controlled by a first control switch, which incudes, in part, an enable input signal to enable the first control switch; an enable output signal to enable a second control switch controlling a second one of the multitude of battery module; and a comparator adapted to monitor an energy level of the first battery module.

When the comparator detects that the energy level of the first battery module is below a reference voltage, a transfer device controlled by the first control switch is enabled to transfer energy from a DC power source to charge the first battery module. When the comparator detects that the energy level of the first battery module reaches the reference voltage, the transfer device is disabled and the enable output is asserted to enable the second control switch. The first control switch and the second control switch form a linkage to control charging of the first battery module and the second battery module sequentially. The linkage is a portion of a sequential charging control chain that includes a multitude of control switches associated with charging the multitude of battery modules sequentially.

In one embodiment, the battery charging apparatus is configured to perform parallel charging of the battery pack. In one embodiment, the battery charging apparatus is coupled to an energy storage system in a building. In one embodiment, the multitude of battery modules is removable and swappable with the energy storage system. In one embodiment, the first one of the multitude of battery modules is configured to have a circular, square, or rectangular cross section. In one embodiment, the multitude of battery modules are placed in a multitude of battery slots of the battery charging apparatus. In one embodiment, the multitude of battery modules are butted together in the battery charging apparatus.

DETAIL DESCRIPTIONS

Figure 1:
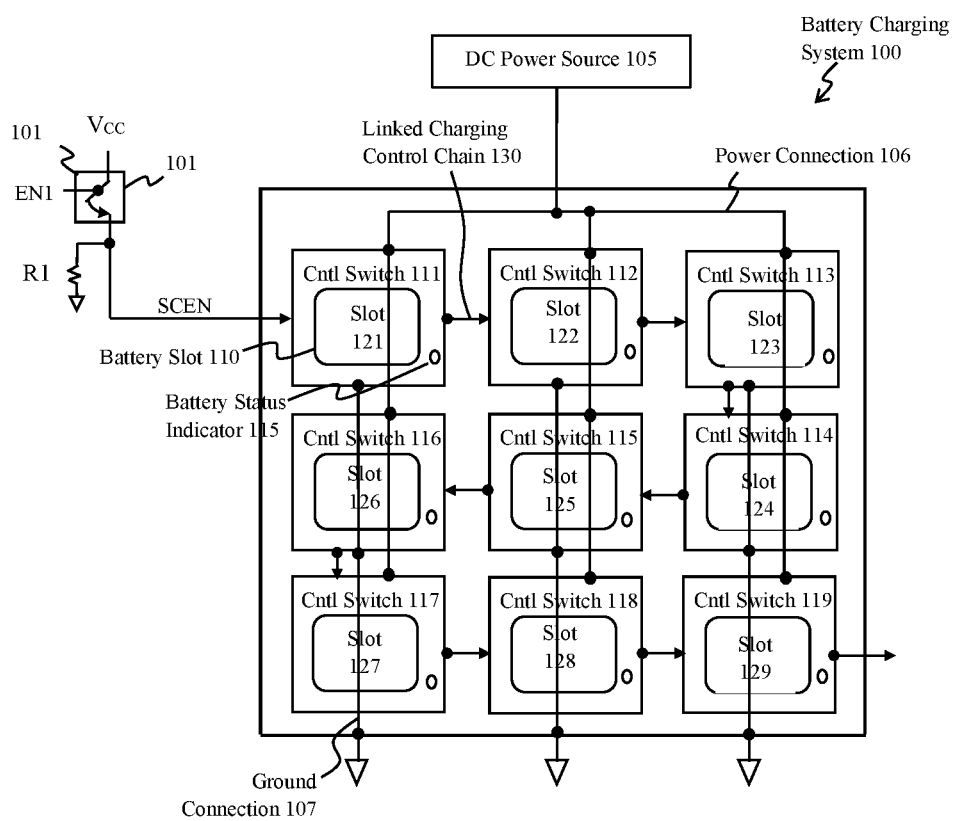
FIG. 1 is an exemplary configuration of a swappable battery module charging system with a sequential charging control chain, in accordance with one embodiment of the present disclosure.

If battery pack in EV could be replaced with a set of smaller, removable, swappable battery modules, so that any energy depleted battery module could be readily swapped and replaced with a fully charged one, it may alleviate the battery energy anxiety encountered for EV, and may foster EV acceptance for the would-be EV buyers with choices to acquire a minimal set of swappable battery modules to meet their usage needs to lower ownership cost. Renting battery modules for EV may be a feasible option in case more are needed for long distance driving. The replacement cost of a defective battery module is cheaper than the replacement of an entire battery pack. Adopting a set of swappable battery modules in EV has advantages over a large battery pack. A swappable Battery-as-a-Service (BaaS) could emerge as a popular business to mitigate the prospective mileage anxiety.

In an embodiment, a swappable battery charging system is composed of a set of charging control switches linked in a sequential charging control chain, it also includes a set of battery slots or receptacles to receive and hold a set of swappable battery modules disposed in the slots for charging the set of battery modules in a predetermined order under the control of a sequential control chain. The system can automatically disconnect external power source from continuously charging the battery module when its energy is fully charged to prevent from being overcharged. A status indicator may be associated with each slot to indicate the energy status of respective swappable battery module in the slot.

Charging swappable batteries sequentially minimizes the power requirement for the charging system. For such a charging system, a common 240V AC power source may be sufficient for a swappable battery charging system, without a need of high-power charger, such as a level-3 battery charger.

Advancements in battery technology could potentially enable more energy to be stored in a battery module. If assuming a swappable battery module can achieve an energy storage capacity of 5 KWh, then an EV of 50 KWh battery may include ten such battery modules. For a battery charging system connected to a 240V, 200 A AC power panel, it is configurable to contain five 240V×40 A (9.6 KW) power chargers, where each of such charger is capable of charging about two 5 KWh battery modules per hour or about 45 such swappable battery modules a day, which is sufficient to power more than 4 EVs of 50 KWh battery capacity. Or a 200 A power panel may serve more than 20 EVs a day. For a Tesla Model 3, the average energy efficiency is about 4 miles per KWh. An EV of 50 KWh battery capacity is adequate to drive about 200 miles. When driving an EV on the road, only some depleted battery modules may be replaced with the fully charged ones enough to reach the destination, where the entire set of battery modules would then be fully charged.

A faster charging is achievable by increasing the charging current to the system, but it may degrade the lifetime of battery modules. The size of battery charging system is scalable, determined by the usage demand of swappable batteries, and could be more affordable for small businesses and might be self-serviced to lower its operation cost. For BaaS, more charging systems may be installed to charge more depleted battery modules in parallel when more power is available. Parallel charging could smooth external power to charge more battery modules in parallel at a more homogeneous rate when external power, such as a regenerated power, becomes intensified.

Two techniques for parallel charging are described herein. In accordance with the first technique, parallel charging may be applied to a portion of battery modules in the system, also referred to herein as partial parallel charging. In accordance with a second technique, all battery modules in the system may be charged in parallel, also referred to herein as direct parallel charging. The charging control depends upon how an external parallel control signal is connected to the enable input signal to the control switches in the system.

For a partial parallel charging, a multitude of control switches in the charging control chain of the system may be grouped into a segment to control the charging for a multitude of associated swappable battery modules in the same segment, such as grouping two control switches in a doublet segment, or grouping three control switches in a triplet segment, or four control switches in a quadruplet segment, and the like. The control switches in an entire control chain may be divided into multiple segments, where the segments are linked sequentially to form the control chain. The battery modules disposed in each segment are charged in parallel. When all the battery modules in, for example a first segment are fully charged, a segment enable signal is asserted to enable parallel charging of all the battery modules controlled by the control switches grouped in the second, succeeding segment. The charging would proceed segment by segment sequentially until all battery modules controlled by the entire control chain are fully charged; this is a "sequential-parallel charging". The sequential-parallel charging enables more battery modules in the system to be charged concurrently at a slower charging rate, if with the same external DC power.

A battery charging system, in accordance with embodiments of the present disclosure, may be installed at home. If a family owns multiple EVs, with such a battery module charging system, a sufficient set of battery modules may be fully charged in a day to meet the needs of all EVs, rather than requiring multiple chargers to charge all battery packs in EVs at home. A battery charging system dispenses the need to monitor the charging status of battery pack in each EV, where if only a level-2 charger is available.

Depending upon the daily driving distance, fewer battery modules may be sufficient for a short distance commuter. Installing a fewer number of battery modules in an electric vehicle may minimize the energy waste, compared to a similar EV carrying a large battery pack. In addition, only a fewer depleted battery modules may need to be replaced if only a few battery modules with energy being used up, thereby dispensing the need for frequent charging of an entire battery pack that is only partially depleted to avoid degradation of the lifetime of battery pack due to frequent charging. There are many advantages to adopt a set of smaller, swappable battery modules in an EV, compared with a single, large battery pack.

As the regenerated energy becomes more popular, a set of batteries may be installed to store energy at home in preparation for a power outage or for sourcing energy in a DC-centric environment. Such home batteries are often different from the battery used in an electric vehicle. It would be advantageous and cost-effective to eliminate the incompatibility between the home battery and the EV battery to enable the usage of the same battery for homes and EVs.

In a battery charging system, a discharging function may be incorporated in control switch to enable both sequential charging and sequential discharging for swappable battery modules in the system, where the sequential discharging function provides a needed power during power breakout. The system would thus become a sequential charging and discharging system for swappable battery modules.

Aspect of the present disclosure relates to control of charging and discharging of a multitude of swappable battery modules without the use of microcontroller or computer. Embodiments of the present disclosure minimize the complexity in configuring a battery charging system at a more affordable cost.

FIG. 1 shows a swappable battery charging system 100 with a sequential charging control chain, in accordance with one exemplary embodiment of the present disclosure. The system is shown as including, in part, a multitude of battery slots 121, 122 . . . 129, where each is adapted to receive and hold a swappable battery module. A control switch 111, 112 . . . 119, each associated with and coupled to a different one of the battery slots 121, 122 . . . 129, is used to control the charging of an associated battery module disposed in the associated slot. A DC power source 105 powers the battery charging system 100. Control switches 111, 112 . . . 119 are linked sequentially to form a sequential charging control chain 130, which is enabled by a key switch 101. When signal EN1 is asserted thus closing a normally-open switch 101, the sequential charge enable signal SCEN is asserted to enable the charging control chain 130. When signal EN1 is de-asserted, key switch is open, thus causing pull-down resistor R1 to negate SCEN, and thereby, disabling the sequential charging control chain 130.

The linking sequence of control switches 111, 112 . . . 119 in the charging control chain 130 determines the charging priority for the battery modules. The battery module controlled by a preceding control switch has a higher priority to be charged than the one controlled by a succeeding control switch in the charging control chain 130. When battery module controlled by a higher priority preceding control switch is fully charged, the charging control will be transferred to charge the battery module controlled by a lower priority succeeding control switch in an order determined by the linking sequence of control switches in control chain, until all battery modules in the system are fully charged.

However, when a fully charged battery module in slot controlled by a higher priority switch is removed and a depleted battery module is placed to the slot, the charging control sequence will be altered to charge the depleted battery module in the higher priority slot. All other fully charged battery modules in the lower priority slots are still available for battery swapping use.

A battery slot in a battery system includes a contact switch to detect the presence of a swappable battery module. The battery slot also includes power and ground contacts for charging the battery module. Placing a swappable battery module in a battery slot will engage an associated control switch in the control chain. Without a battery module in the slot, the associated control switch is automatically disengaged from the charging control chain. The number of charging slots or the length of the charging control chain in the system is scalable, which can be easily expanded as the demand for swapped battery modules increases.

In each battery slot, a power connection 106 (coupled to the DC power source 105) and a ground connection 107 (coupled to system ground) provide power and current return path for the battery module. A battery status indicator 115 disposed and associated with each battery slot is used to provide a readout of the energy status of the battery module in the slot.

Figure 2:
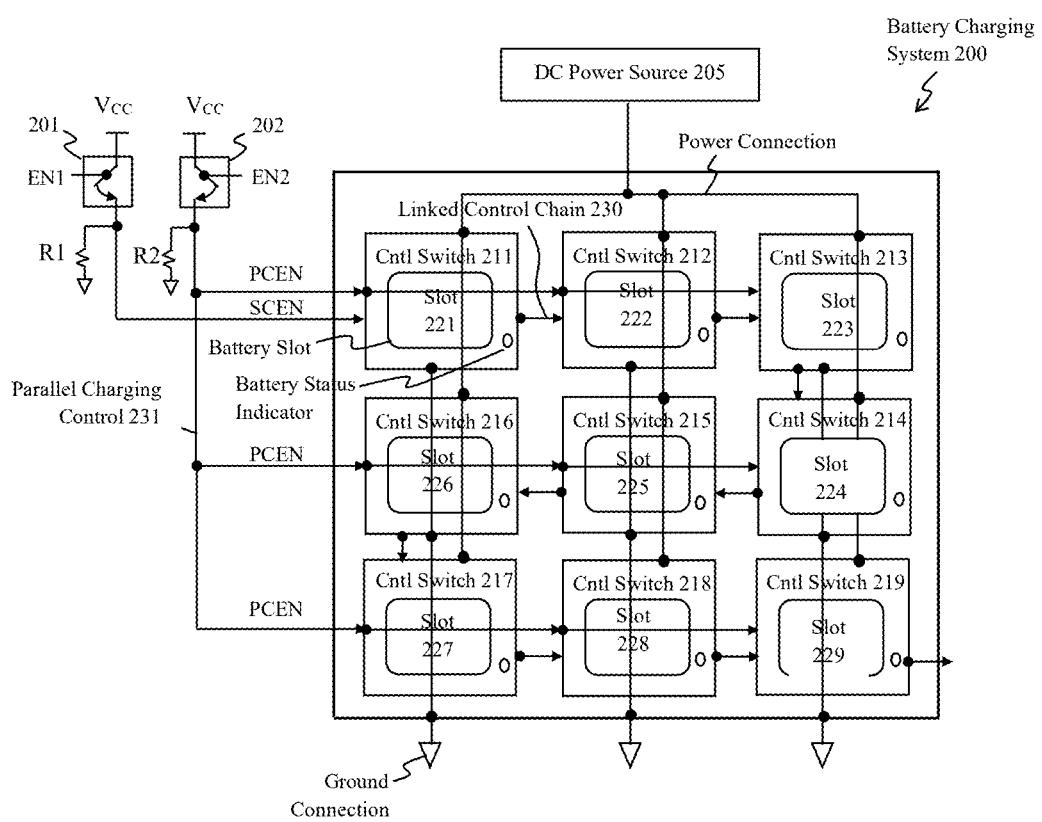
FIG. 2 is an exemplary configuration of a swappable battery module charging system with a sequential charging control chain and a direct parallel charging function, in accordance with one embodiment of the present disclosure.

FIG. 2 shows a swappable battery charging system 200 with an additional parallel charging control function, in accordance with another exemplary embodiment of the present disclosure. Battery charging system 200 is shown as including, in part, a multitude of battery slots 221, 222 . . . 229, each adapted to receive and hold a swappable battery module when placed therein. A control switch 211, 212 . . . 219, each associated with and coupled to a different one of the battery slots 221, 222 . . . 229, is used to control the charging of an associated battery module disposed in the associated slot. The parallel charging function is controlled by key switch 202. When signal EN2 is asserted thus closing key switch 202, a parallel charging enable signal PCEN is asserted, thus enabling the charging of all control switches 211, 212 . . . 219 in the control chain 230 by the DC power source 205 in parallel. The sequential charge enable signal SCEN is used for sequential charging as described above with respect to FIG. 1.

Parallel charging may take a longer time to charge a battery module in the battery charging system 200, under the same amount of power from DC power source 205, but all battery modules will be charged concurrently. Signal PCEN or SCEN may be enabled to conduct parallel charging or sequential charging, respectively, for the battery modules placed in the battery charging system 200. However, when both signals PCEN and SCEN are asserted, the parallel charging takes precedence over the sequential charging and the sequential charging is disabled. Thus, the battery charging system 200 can be switched between the parallel charging and the sequential charging by simply switching the PCEN signal ON or OFF, while the SCEN signal is asserted. When key switches 201 and 202 are both open, their associated pull-down resistors R1 and R2 will negate signals PCEN and SCEN respectively to disable the charging of the entire battery charging system 200. With signal SCEN asserted, but PCEN negated (i.e. de-asserted), the linked charging control chain 230 performs sequential charging for the set of battery modules in battery slots 221, 222 . . . and 229.

Figure 3:
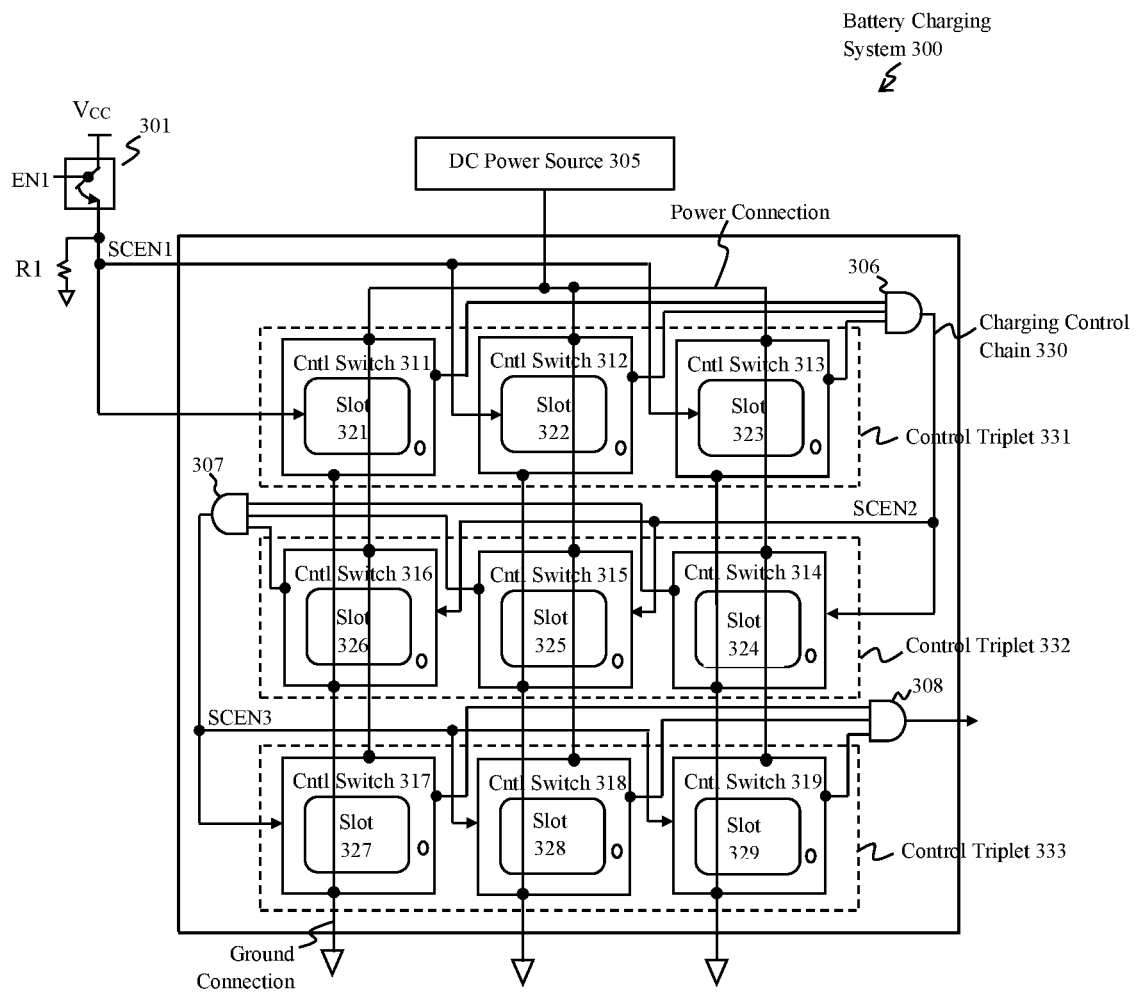
FIG. 3 is an exemplary configuration of swappable battery module charging system with a "sequential-parallel" charging control chain, in accordance with one embodiment of the present disclosure.

FIG. 3 shows a swappable battery charging system 300, which incorporates a segmented sequential-parallel charging function in charging control chain 330, in accordance with another exemplary embodiment of the present disclosure. Swappable battery charging system 300 is shown as including, in part, a multitude of battery slots 321, 322 . . . 329, each adapted to receive and securely hold a swappable battery module when insert therein. A control switch 311, 312 . . . 319, each associated with and coupled to a different one of the battery slots 321, 322 . . . 329, is used to control the charging of an associated battery module disposed in the associated slot. The sequential-parallel segmented charging control chain 330 partitions the charging control chain into multiple segments, where each segment includes a set of control switches adapted to control the charging of the associated battery modules in that segment in parallel. As shown in FIG. 3, the charging control chain 300 is partitioned into three exemplary triplets or three control segments 331, 332, 333, each (triplet) including 3 battery slots or three control switches. For example, control segment 331 is shown as including battery slots 321, 322 and 323. Control segments 331, 332, 333 are connected in series to form a sequential chain with a preceding segment having a higher priority than a succeeding segment. Accordingly, control segment 331 has a higher priority than control segment 332, and control segment 332 has a higher priority than control segment 333. Different number of control switches may be grouped in a segment. For example, a control segment may include two control switches, or four control switches, depending, for example, on the amount of power of the external DC power source 305.

All control switches disposed in the same control segment receive the same enable input signal either from a preceding segment or from an external control. For example, control switches 311, 312, 313 forming control segment 331 receive the same enable input signal SCEN1 from external key switch 301. When the key switch 301 is closed, the enable input signal SCEN1 is asserted to connect DC power source 305 to charge all swappable battery modules associated with the control segment 331 in battery slots 321, 322, and 323 in parallel, while the battery modules in the succeeding control segments 332 and 333 are not being charged.

When all battery modules controlled by the control switches 311, 312, 313 in control segment 331 are fully charged, the enable output signals from control switches 311, 312, and 313 are ANDed together by AND gate 306 to generate a segment enable output signal SCEN2 to enable control switches 314, 315, 316 in the succeeding control segment 332 to charge the battery modules in battery slots 324, 325, 326 in parallel. Similarly, when all battery modules in battery slots 324, 325, 326 are fully charged, the control segment 332 will assert another segment enable output signal SCEN3 which ANDs the enable output signals from control switches 314, 315, 316 in control segment 332 with AND gate 307 to enable parallel charging of battery modules in the battery slots 327, 328, 329 of control segment 333. The process continues until all battery modules in the battery charging system 300 are fully charged. The sequential-parallel charging function is a selection between the sequential power charging and the direct parallel charging, depending upon the available amount of power for battery charging under a controlled battery charging rate.

Figure 4:
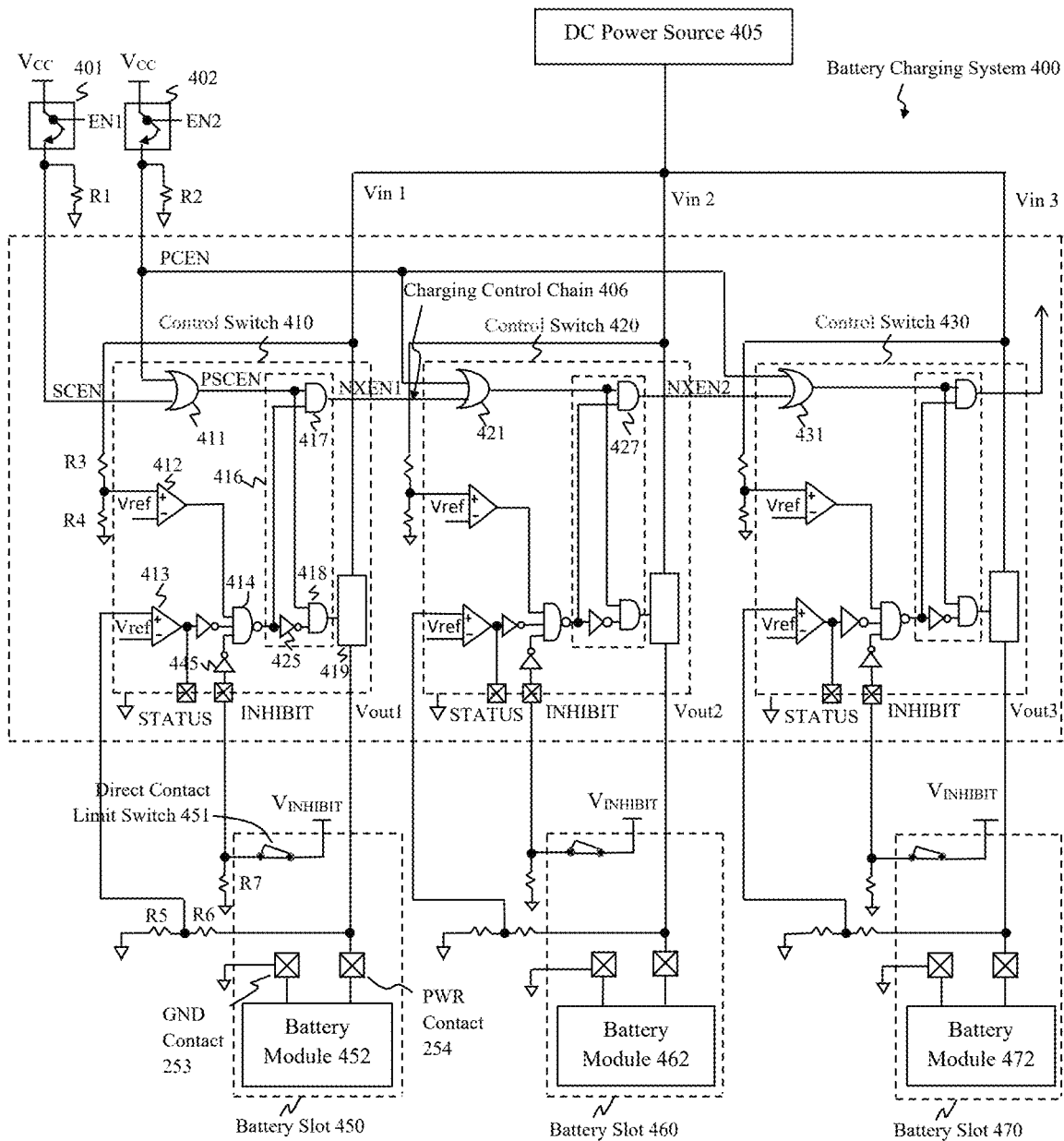
FIG. 4 is an exemplary swappable battery module charging system with control switches linked in a sequential charging control chain with direct parallel charging control, in accordance with one embodiment of the present disclosure.

FIG. 4 is a schematic diagram of an exemplary battery charging system shown as having three control switches linked in a sequential charging control chain, as well as a direct parallel charging control coupled to each control switch. The direct parallel charging control is optional and may be eliminated from the charging control chain. The battery charging system 400 is shown as including, in part, three control switches 410, 420 and 430 that are alike, where control switch 410 is shown as including, in part, a comparator 413 adapted to monitor the energy level of battery module 452 disposed in battery slot 450. The control switch 410 shown also includes, in part, a 1:2 demultiplexer 416. Here the demultiplexer 416 includes a pair of AND gates 417, 418 at its two outputs and an inverter 425 to activate one of two outputs, when the demultiplexer 416 is enabled.

The output of AND gate 418, when asserted, enables transfer device 419 disposed in control switch 410 to transfer energy from DC power source 405 to charge battery module 452 if (i) comparator 413 detects insufficient energy in battery module 452 and (ii) the enable input signal SCEN applied to control switch 410 is asserted. The output of AND gate 417, when asserted, enables the succeeding control switch 420 when either the energy in the battery module 452 is detected as being full (or above a threshold voltage), or when an abnormality is detected in the control switch 410. The NAND gate 414 generates a select control signal for demultiplexer 416. The enable input signal PSCEN is applied to AND gates 417 and 418 disposed in demultiplexer 416. The comparator 412, which compares an attenuated voltage by voltage divider R3, R4 with a reference voltage Vref, same as the charging reference voltage, monitors the energy level from an external DC power source 405. Inverter 445 inverts the INHIBIT signal shown as being applied to NAND gate 414. Signal INHIBIT provides a mean for an external event to suspend the operation of an associated control switch 410 in battery charging system 400. Although not shown, signals representative of other abnormalities, such as overcurrent, over-temperature, or short circuit, may be input to the NAND gate 414 to generate the demultiplexer select control signal.

An exemplary direct contact limit switch in each slot detects the presence of battery module. When no battery module is in the slot, the closure of the normally-closed direct contact limit switch would assert an output to inhibit an associated control switch to disengage the control switch from the charging control chain. The disengaged or deactivated control switch will assert an enable output signal to enable a succeeding control switch in a succeeding slot. The direct contact switch becomes open when a battery module is in the slot. A pull-down resistor connected to the output of the direct contact limit switch outputs a low signal to negate the INHIBIT input to the associated control switch, which disengages the control switch from the charging process in a charging control chain. A contactless proximity sensor, such as capacitive sensor, electrostatic sensor, magnetic sensor, or optical sensor may also be applied to detect the presence of a battery module in a battery slot.

In FIG. 4, the direct contact limit switch 451 is used to detect the presence of battery module 452 in the battery slot 450 of battery charging system 400. The direct contact limit switch 451 is a normally-closed sensor, adapted to detect the presence of the battery module, having a first terminal that is connected to a logic high $V_{INHIBIT}$, and a second terminal that is connected to a relatively high resistance pull-down R7, which, in turn, is further connected to the INHIBIT input of control switch 410. When there is no battery module in the slot 450, the normally-closed direct contact limit switch 451 applies $V_{INHIBIT}$ to the INHIBIT input of control switch 410, which suppresses the control switch 410 from undergoing the charging function in the charging control chain 406; this causes signal NXEN1 to be asserted to enable a succeeding control switch 420 in the charging control chain 406 to proceed charging function for the battery module 462 disposed in slot 460.

When a battery module 452 is present in slot 450, the direct contact limit switch 451 becomes open. There is a power contact 254 and ground contact 253 coupled to the battery module 452 in slot 450. The pull-down resistor R7 at the output of direct contact limit switch 451 negates the INHIBIT input to control switch 410 and engages the charging control switch 410 into the charging operation of the charging control chain 406. The output of comparator 413, which compares the input of voltage divider R5, R6 to a charging reference voltage Vref, monitors the energy (charge) level of battery module 452. A saturated low signal at the output of comparator 413, which is indicative of insufficient energy in the battery module 452, causes the demultiplexer 416 to enable the transfer device 419 to charge battery module 452 through power contact 254 until the battery is fully charged or is charged to a desired level. Thereafter, the output of NAND 414 changes state to disable transfer device 419, which disconnects DC power source 405 from charging the battery module 452, and to assert signal NXEN1 to enable the control switch 420 to charge battery module 462 in the succeeding battery slot 460. The process continues until all battery modules 452, 462, 472 in battery slots 450, 460, and 470 are fully charged or charged to a desired level. The control switches 410, 420 and 430 are linked in a sequential charging control chain 406 to automatically facilitate the charging of all battery modules 452, 462, 472 sequentially without the need for an external microcontroller to control the sequential enabling for the battery modules. The charging control chain in a swappable battery charging system can automatically skip all slots without battery module in the slot by way of using direct contact limit switch to detect the presence of battery module in the battery charging system.

The external DC power 405 may be applied to charge all battery modules 452, 462, and 472 in the battery charging system 400 in parallel by applying a parallel enable signal PCEN to all control switches. In FIG. 4, the PCEN signal output from key switch 402 is ORed with the enable input signal to each control switch, which includes the SCEN output from key switch 401, the NXEN1 and NXEN2 output from AND gates 417 and 427, at OR gate 411, 421, and 431 respectively to become a new enable input signal to each of control switches 410, 420, and 430 in the battery charging system 400.

Figure 5:
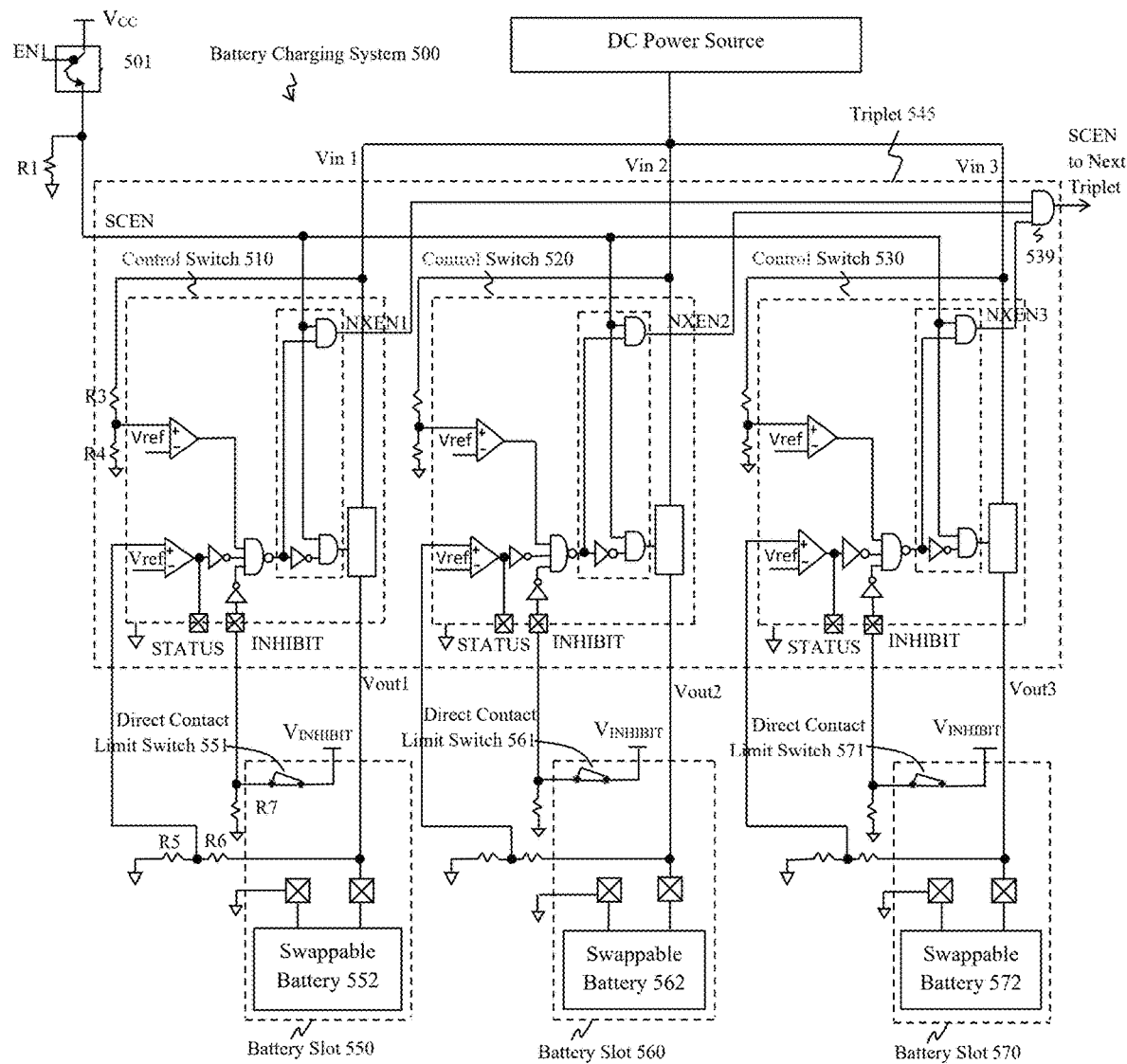
FIG. 5 illustrates a set of control switches in a triplet configuration to charge three swappable battery modules in parallel in a sequential-parallel charging control chain, in accordance with one embodiment of the present disclosure.

FIG. 5 illustrates a set of control switches 510, 520, 530 configured in a triplet 545 for charging three swappable battery modules 552, 562, 572 in a "sequential-parallel" charging control chain in a battery charging system 500. One control triple segment 545 is shown in the example. The control triplet segment 545 is enabled by the SCEN signal output of key switch 501. When the key switch 501 is closed, the control triplet segment 545 is enabled to charge the battery modules 552, 562, 572 disposed in battery slots 550, 560, 570 in parallel. Direct contact limit switches 551, 561, 571 are configured respectively to detect the presence of swappable battery modules 552, 562, 572 in battery slot 550, 560, 570. When the battery module is fully charged or when the battery module is not in a battery slot, signals NXEN1, NXEN2, NXEN3 that are output respectively from control switches 510, 520, 530 will be asserted. Signals NXEN1, NXEN2, NXEN3 are ANDed by AND gate 539 to generate the enable signal for the next control triplet segment, not shown in FIG. 5. When all NXEN1, NXEN2, NXEN3 are asserted, indicative of (i) battery slots 550, 560, 570 being empty, or (ii) battery modules 552, 562, 572 being fully charged, or (iii) a combination of some battery slots being open and some battery modules being fully charged, the output of AND gate 539 will be asserted to enable the next triplet (not shown in FIG. 5) of the battery charging system 500.

A sequential control chain must be able to detect and skip a defective swappable battery module placed in a battery slot that cannot be charged up, to prevent it from clamping or stalling the sequential control chain. The detection circuit may be embedded in battery slot as a companion logic to the control switch to detect a defective battery module.

In an embodiment, the detection circuit may comprise a timer, a timer enable-control logic and a Set-Reset Flip-flop (SRFF), where the timer may consist of a down-counter, a controllable preset value, and a logic to trigger the loading of a pre-set value into the counter. The output of SRFF is connected to the INHIBIT input of an associated control switch. The SRFF is set by the timer when it times out and is reset by the removal of battery module from the slot.

Figure 6A:
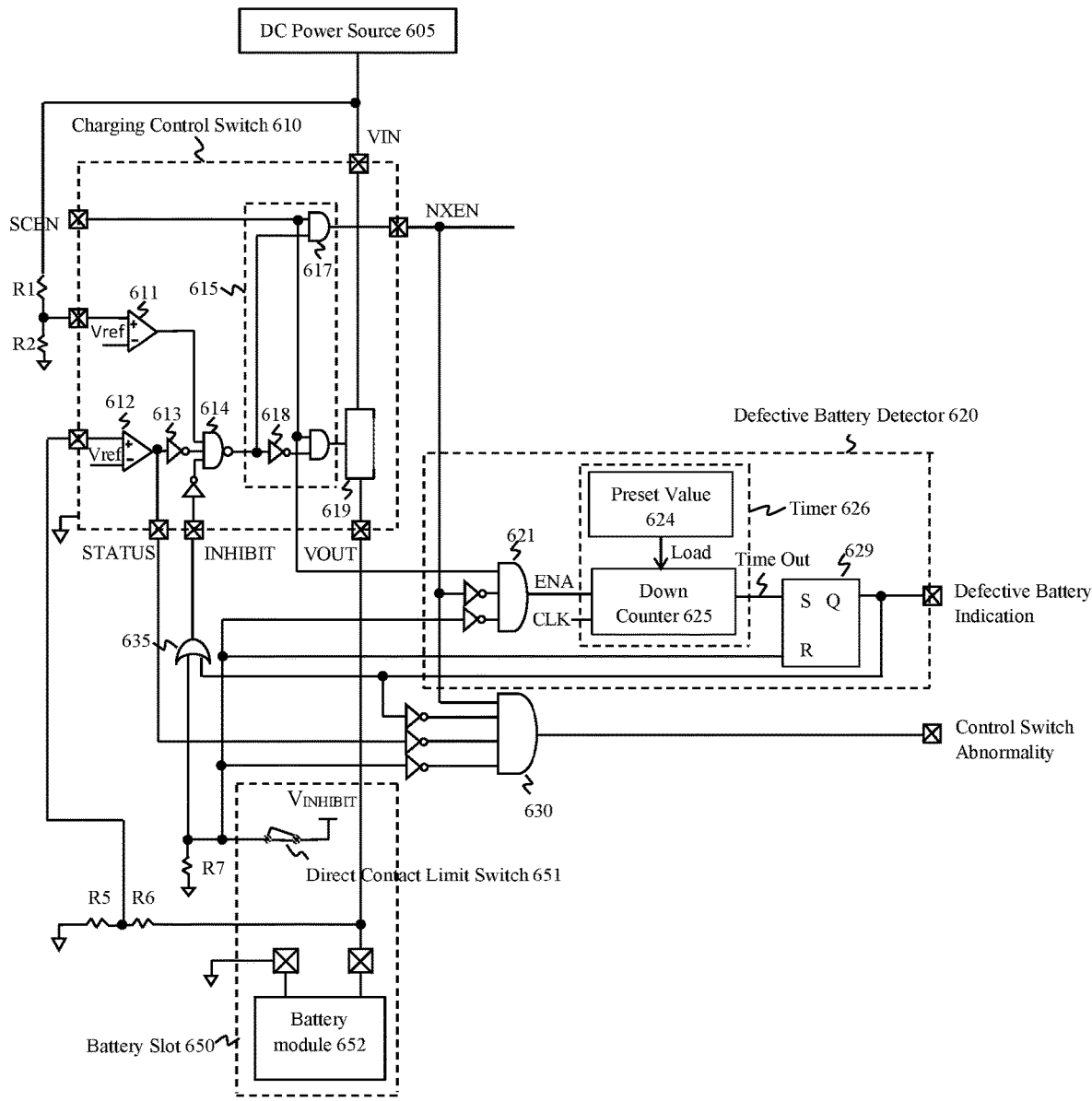
FIG. 6A shows an exemplary circuit to detect defective battery module in a sequential charging control chain, in accordance with one embodiment of the present disclosure.

FIG. 6A shows an exemplary circuit coupled to a charging control switch adapted to detect a defective module in a sequential battery charging system. The defective battery module detector 620 includes a preset value 624, a down-counter 625, a set-reset flip-flop (SRFF) 629, and associated control logic. The preset value reflects the maximum time required to fully charge a battery module being positioned in the battery slot 650, which is a programmable, pre-loaded value in the detector 620 being determined by the energy capacity of battery module 652 and the intensity of DC power source 605. The preset value 624 and the down-counter 625 with a clock together form a timer 626 in the detector 620.

In a normal operation, when a battery module positioned in a battery slot is without sufficient energy and when a sequential enable input (SCEN) is asserted to an associated control switch, it will trigger the loading of a preset value into the down-counter and enable the counter to count-down. But if energy in the battery module becomes fully charged before the down-counter reaches zero, the count-down is then disabled. However, if the counter is continuously counted down to zero, the SRFF output will be set, which indicates the battery module cannot be fully charged in a specific timing interval and the battery module may be defective. The SET output of SRFF asserts the INHIBIT signal to the associated control switch to deactivate it from the charging system. The assertion of SRFF output indicates a defective battery module may exist in the charging system.

As shown in FIG. 6A, if a swappable battery module 652 in battery slot 650 without sufficient energy, then at the assertion of enable input signal SCEN to control switch 610, while without the assertion of NXEN signal, it will trigger the loading of a preset value 624 into the down-counter 625 and also enable its countdown in response to each transition of a clock signal CLK. The clock may be generated internally in the defect detection circuit 620. The defect detection circuit 620 may be incorporated in the control switch 610 or implemented as a separate ASIC, or by using discrete devices.

The rise of signal ENA output from AND gate 621 loads the preset value 624 into the down-counter 625. When the down-counter 625 counts down to zero, a time-out output will set SRFF 629, which indicates a defective battery module in battery slot 650. The output Q of SRFF is ORed at OR gate 635 with the output of direct contact limit switch 651 as an input signal to the INHIBIT of control switch 610, which is adapted to (i) deactivate the control switch 610 from the sequential charging control chain and (ii) assert signal NXEN to enable the succeeding control switch to continue the charging operation of the battery system.

If a functioning battery module is in battery slot, it can be fully charged before the down-counter reaches zero. When the comparator 612 in control switch 610 detects that battery module 652 is fully charged, the comparator asserts signal NXEN to enable a succeeding control switch in the charging control chain. The assertion of signal NXEN also disables signal ENA, thereby to stop the down-counter 625. When any battery module, including a defective battery module, is removed from the battery slot 650, the direct contact limit switch 651 becomes closed and its output becomes high to reset the SRFF 629.

The countdown stops when control switch 610 asserts signal NXEN, which may occur either due to the battery module being fully charged, or an abnormal event taking place in control switch 610. It is useful to identify an abnormality event in the control switch. The AND gate 630 can detect an abnormal event in control switch 610 by ANDing (i) the inverted output from direct contact limit switch 651, (ii) the NXEN output from control switch 610, (iii) the inverted defective battery module indication signal generated by the defect battery detector 620, and (iv) the inverted STATUS output.

In a normal operation, the direct contact limit switch 651 outputs a low signal, when a battery module is present in battery slot 650. When the control switch 610 asserts the enable output signal NXEN earlier than the counter 625 being timed out, with the SRFF not being set, it indicates no defective battery module, no abnormal event being detected, and the battery module 652 being fully charged. A low at the STATUS output with assertion of the NXEN signal but without the time-out of counter 625, indicates that the battery module charging process is still on-going, the assertion of the output of AND 630 indicates that the control switch 610 may have suffered abnormality, such as over-temperature, short circuit, overcurrent, and the like.

An alternative implementation to detecting a defective battery module in a sequential battery charging system, for example, may use an up-counter, a pre-set value, and a comparator. The up-counter is cleared or initialized to zero by the assertion of the enable control signal NXEN applied to a succeeding control switch. The up-counter is also cleared by the system reset or the absence of battery module in the associated battery slot. The up-counter is enabled to count-up when an enable control signal SCEN to its associated control switch is asserted to charge the battery module, but stops counting-up when the signal NXEN is asserted. For a functioning battery module, the counter stops counting-up before reaching the pre-set value. The STATUS output from a control switch reflects the energy status of the associated battery module in the slot. The assertion of the STATUS output from a control switch indicates that the battery module in the slot is fully charged. However, when the up-counter matches the preset value, as detected by a magnitude comparator, the magnitude comparator output will set the SRFF to assert the INHIBIT signal so as to deactivate/disengage the associated control switch in a sequential control chain. An asserted SRFF output indicates the existence of a defective battery in the battery charging system.

Figure 6B:
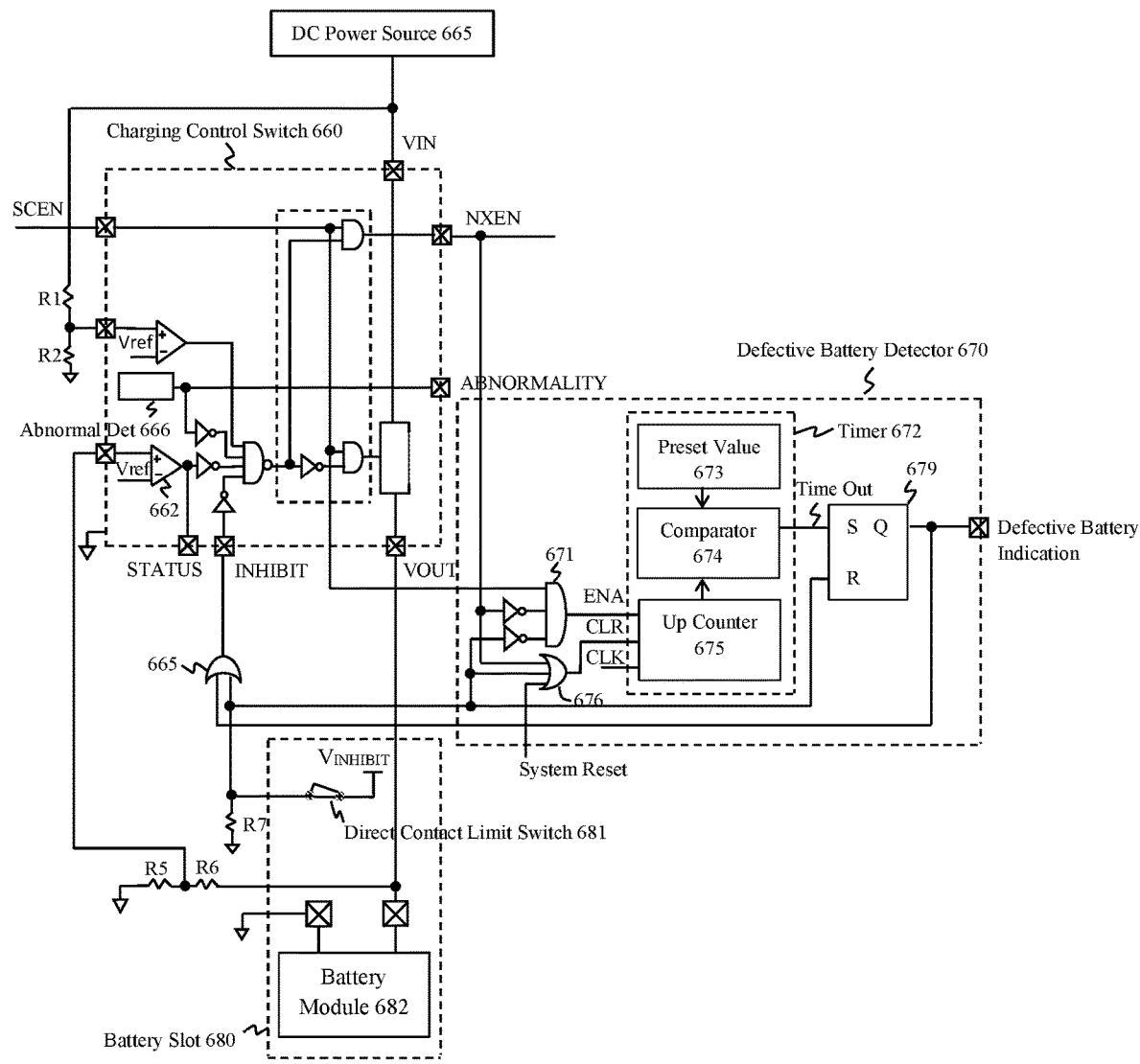
FIG. 6B shows another implementation of defective battery module detection circuit for a sequential charging control chain, in accordance with one embodiment of the present disclosure.

FIG. 6B is a schematic diagram of an alternative defective battery module detection circuit for a sequential control chain, in accordance with an embodiment of the present disclosure. An up-counter, rather than a down-counter, is used in this embodiment. The defective battery module detector 670 includes a timer 672, which includes, in part, an up-counter 675, a magnitude comparator 674, an enable and a clear/reset logic for up-counter 675, a SRFF 679, and a preset value 673. The enable signal ENA for up-counter is an output from AND gate 671, which ANDs the input enable signal SCEN to control switch 660, the inversion of enable-output signal NXEN from control switch 660, and the inversion of the output of contact limit switch 681. Similarly, the preset value 673 is programmable and is pre-loaded into a register. It reflects the maximum time required to charge up a battery module, whose energy level is monitored by a voltage comparator 662.

When a battery module 682 is placed in battery slot 680, the direct contact limit switch 681 delivers a low output by its associated pull-down resistor R7. The assertion of the enable input signal SCEN to control switch 660, while the NXEN signal is not asserted yet, will cause the control switch 660 to charge the battery module 682 in battery slot 680 and to enable the up-counter 675 to increment its count in response to each transition of the clock signal CLK. The value (count) of up-counter 675 is compared with the preset value 673 by a magnitude comparator 674. For a normal operation, each time when the battery module in slot 680 is fully charged, signal NXEN is asserted by control switch 660 to enable a succeeding control switch and to clear the up-counter 675 concurrently before the counter reaches the preset value. However, when the up-counter 675 continues to count-up and reaches the preset value, a time-out signal will be asserted by the magnitude comparator 674 to set the SRFF 679, which may be observable externally via the defective battery indication output. An asserted Q output of SRFF 679 indicates the presence of a defective battery module in the slot 680 which cannot be fully charged in time.

The up-counter 675 may be cleared by a system reset, by the assertion of NXEN signal, or by the removal of battery module 682 from battery slot 680, which causes the output of direct contact limit switch 681 to assert a high. The removal of battery module from battery slot 680, or when the SRFF 679 is set, will cause the INHIBIT signal to control switch 660 to be asserted as OR gate 665 shows. The SRFF 679 is reset only by the removal of the defective battery module from the battery slot 680. Resetting of SRFF also clears the defective battery indication output. In an alternative embodiment, any abnormality detected by the abnormality detector 666 in control switch 660 may be directly observable at a dedicated ABNORMALITY output pin. Alternatively, a similar abnormality detection circuit as shown in FIG. 6A may be used.

Figure 7:
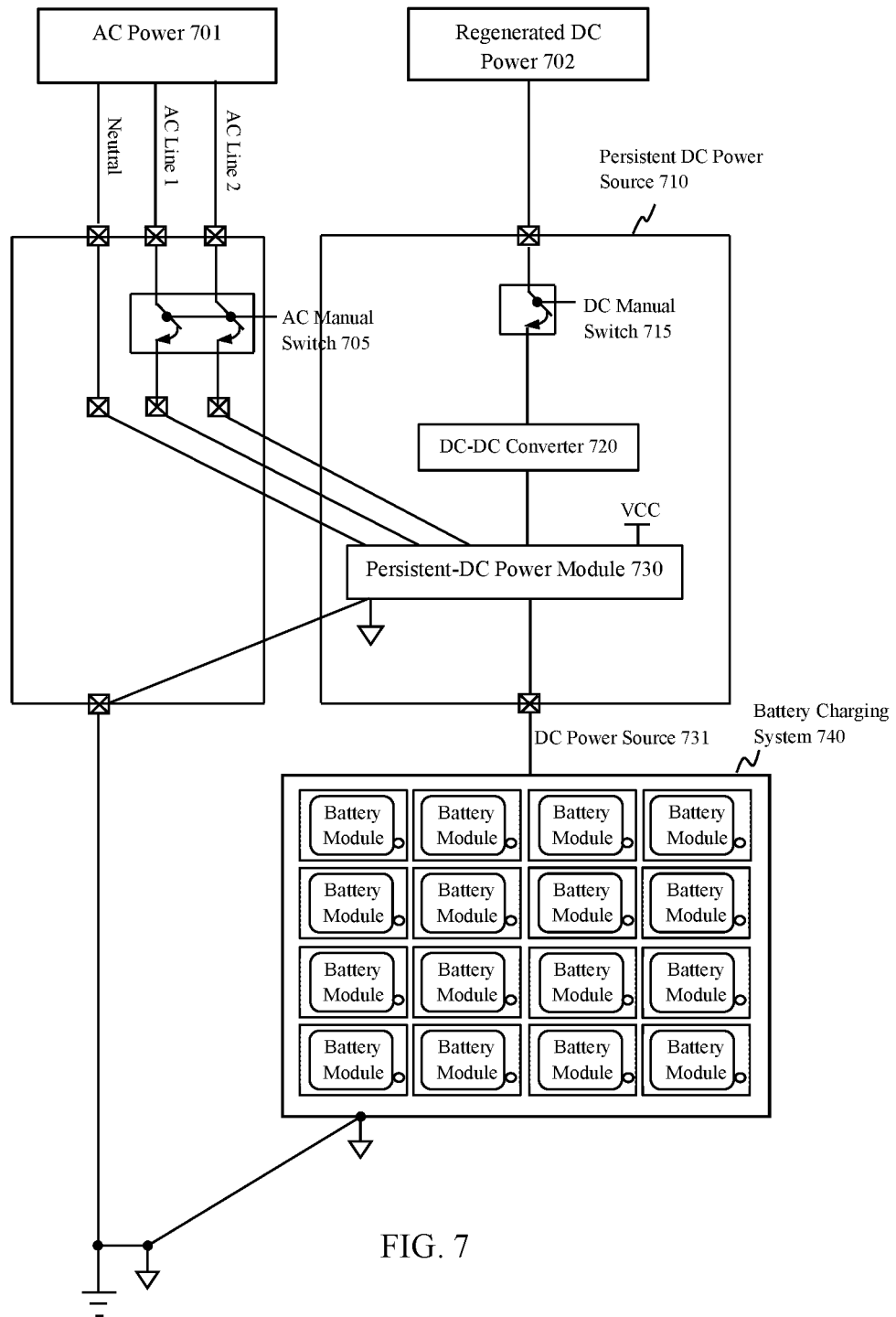
FIG. 7 is an exemplary swappable battery module charging system powered by a persistent DC power supply, in accordance with one embodiment of the present disclosure.

FIG. 7 is a schematic diagram of a swappable battery charging system 740, in accordance with one embodiment of the present disclosure. Swappable battery charging system 740 is shown as being connected to a persistent DC power configuration 710, which receives power either (i) from the regenerated DC power 702 or (ii) from the AC power 701. In the persistent DC power configuration 710, the input from a regenerated DC power 702 is regulated by a DC-DC converter 720 to generate a regulated voltage that is applied to the persistent DC power module 730, which in turn, generates DC power delivered to DC power source 731 for use by the battery charging system 740. When an internal voltage comparator in the persistent DC power module 730 detects that the regulated voltage from the DC-DC converter 720 is below a threshold value, the persistent DC power module 730 will enable AC power 701 to supply power to the persistent DC power module 730. An AC-DC converter disposed in the persistent DC power module 730 converts the AC voltage to a DC voltage whose level matches the regulated voltage. The converted DC voltage is supplied to DC power source 731 which serves as a source of DC power to the battery charging system 740. However, if the regulated voltage increases and recovers, the persistent DC power module 730 will disconnect the AC power received by the AC-DC converter and switches to the regulated voltage for sourcing of DC power to the DC power source. The power system, therefore, optimizes the use of available powers for the battery charging system 740.

Figure 8:
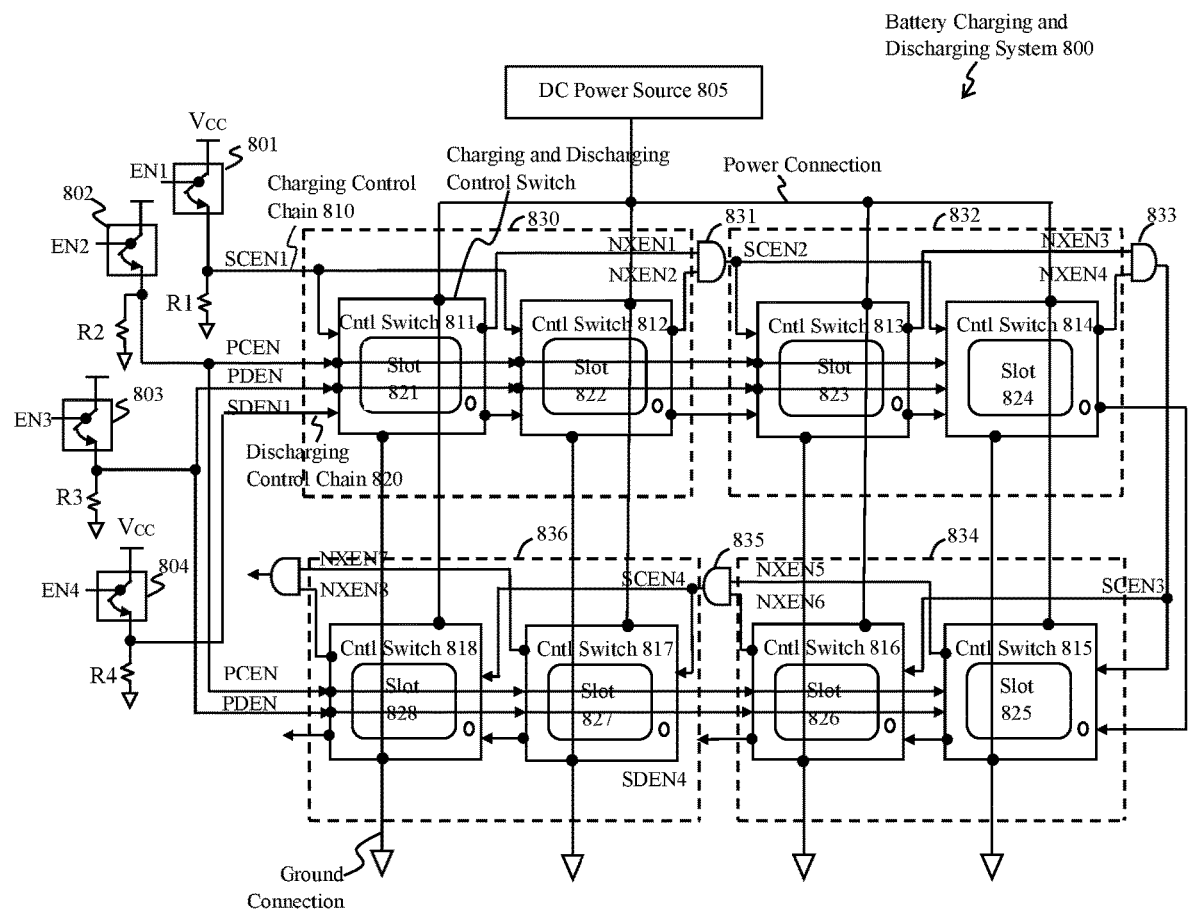
FIG. 8 is an exemplary swappable battery module charging and discharging system combining sequential and parallel functions and with charging and discharging controls, in accordance with one embodiment of the present disclosure.

FIG. 8 is a schematic diagram of a swappable battery charging and discharging system 800 adapted to provide sequential and parallel control for the charging and discharging system, in accordance with one embodiment of the present disclosure. Eight charging and discharging control switch switches 811, 812, 813, 814, 815, 816, 817 and 818, associated respectively with battery slots 821, 822, 823, 824, 825, 826, 827 and 828 are shown in this example. It is understood that other embodiments may have more or fewer charging/discharging control switches and battery slots. The charging function of control switches 811, 812 . . . 818 is linked to form a pair-segmented sequential charging control chain 810. The sequential charging control chain 810 is enabled by key switch 801 when signal EN1 key is asserted, and is disabled by pull-down resistor R1 when signal EN1 key is de-asserted. The discharging function of control switches 811, 812 . . . 818 is linked to form a sequential discharging control chain 820. The sequential discharging control chain 820 is enabled by key switch 804 when signal EN4 is asserted, and is disabled by a pull-down resistor R4 when signal EN4 key is de-asserted.

The sequential charging control chain 810 is partitioned into four charging segments 830, 832, 834, 836 in this example. Each charging segment composed of a pair of control switches. The four charging segments are enabled by four enable signals SCEN1, SCEN2, SCEN3 and SCEN4 respectively, which are, in part, responsive to the output of key switch 801 and the output of AND gates 831, 833, and 835, by ANDing the NXEN1 and NXEN2, NXEN3 and NXEN4, NXEN5 and NXEN6 outputs of control switches in segment 830, 832, or 834 respectively. When a charging segment is enabled, all control switches in the segment are enabled to charge all battery modules in the associated battery slots in parallel. Different number of control switches can be grouped into a segment by ANDing all enable outputs NXENx from all control switches in the same segment to generate a segment enable output signal for a succeeding segment.

A system of parallel-sequential battery charging control chain can be converted into a fully parallel charging system by applying the same parallel charging enable signal PCEN, enabled by key switch 802, to all control switches in the system 800. Similarly, a parallel discharging system can be achieved by applying a parallel discharging enable signal PDEN, enabled by key switch 803, to all control switches in the battery system 800.

In addition to detecting vacant slots and the defective battery module slots, the sequential charging control chain can automatically skip all slots whose associated battery modules are charged above a charging reference voltage to search for any depleted battery module in the control chain for charging. The sequential charging control chain does not require a computer or controller to control the charging process of the battery system. A status indicator can be placed adjacent to each battery slot to indicate the energy status of an associated battery module.

Similarly, a sequential discharging control chain can automatically skip all slots whose associated battery modules have charges below a discharging reference voltage to search for battery modules in the discharging control chain 820 whose energy is above the discharging reference voltage for discharging use. For a charging segment, all battery modules associated with the control switches in the same charging segment are charged above the charging reference voltage before moving to a succeeding segment. For a discharging segment, the control switches in the same segment may be configured to increase the output voltage or to increase the output current and with different configurations for a consistent output voltage or for a consistent output current.

In FIG. 8, the discharging control chain 820 is not segmented. The discharging control chain can be segmented differently from the charging control chain, if required. For example, when a discharging control chain is segmented and with the group of control switches in the same segment being enabled to discharge the associated battery modules in parallel then the output current can increase in proportion to the number of control switches in the segment.

Figure 9:
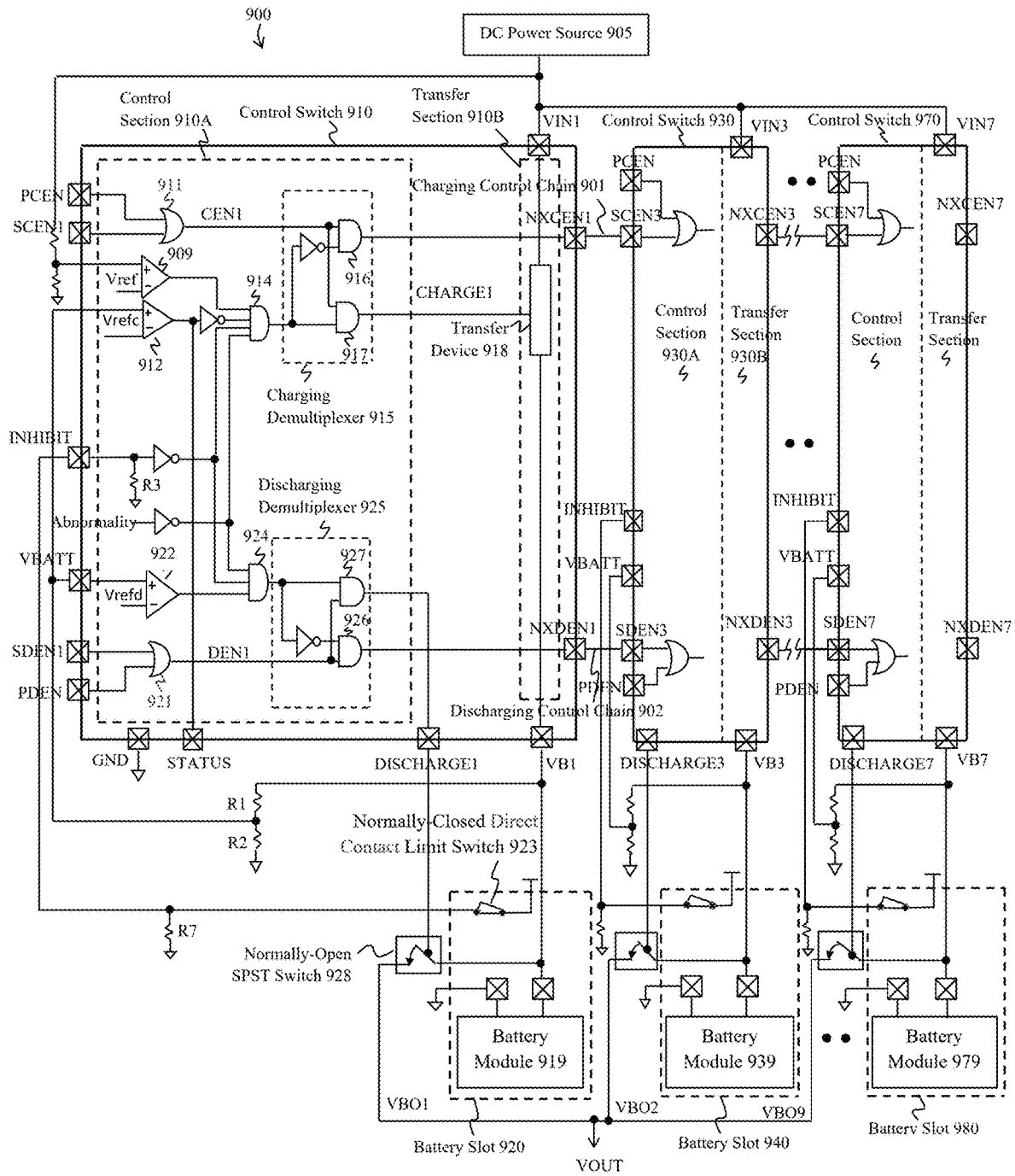
FIG. 9 is an exemplary implementation of a set of charging and discharging control switches in a sequential control chain with parallel charging and parallel discharging functions for swappable battery modules, in accordance with one embodiment of the present disclosure.

FIG. 9 shows, in more detail, three charging and discharging control switches 910, 930 and 970 linked in an exemplary sequential control chain, incorporated parallel charging and parallel discharging function for the associated battery modules 919, 939, and 979 disposed in battery slots 920, 940 and 980 respectively. However, more control switches may be used. Each control switch 910, 930, 970 includes a control section and a transfer section. Control switch 910 is shown as including a control section 910A and a transfer section 910B. Similarly, control switch 930 is shown as including a control section 930A and a transfer section 930B, and so on.

Control switch 910 is shown as including, in part, a control section 910A, which includes a charging demultiplexer 915 and various control logic for the charging demultiplexer control, where the control logic includes, for example, a charging enable input logic to generate signal CEN1 by OR gate 911 and a charging demultiplex select control logic of AND 914. The control section 910A also includes, in part, a discharging demultiplexer 925 and various control logic for the discharging demultiplexer control, such as the discharging enable input logic generating signal DEN1 by OR gate 921 and the discharging demultiplexer select control logic by AND 924.

Each charging demultiplexer in a control switch receives a charging enable input signal. In the example of FIG. 9, signal CEN1 is the input enable signal for the charging demultiplexer 915, which is generated by ORing the sequential input enable signal SCEN1 input to control switch 910 with the parallel charging input enable signal PCEN. The charging demultiplexer 915 generates two output signals, where one is a charging enable output signal, such as NXCEN1, to link with the sequential charging enable input signal SCEN3 to the charging demultiplexer in control section 930A of the succeeding control switch 930, which in-turn, is linked to the charging demultiplexer in the control section of the succeeding control switch 970 sequentially to form a charging control chain 901.

Each discharging demultiplexer in a control switch has a discharging enable discharging-enable input signal, such as the DEN1 in control switch 910, generated by ORing the sequential discharging enable input signal SDEN1 with the parallel discharging enable input signal PDEN at OR 921. The discharging demultiplexer also generates a discharging enable discharging-enable output signal, such as NXDEN1 from control switch 910, to link with the sequential discharging enable discharging-enable input signal SDEN3 to the discharging demultiplexer in control section 930A of the succeeding control switch 930, which in-turn, is linked to the discharging demultiplexer in the control section of the succeeding control switch 970 sequentially to form a discharging control chain 902.

In addition, referencing control switch 910 as an example, when the charging enable input signal CEN1 to the charging demultiplexer 915 is asserted, one of its outputs at AND 917 coupled to transfer device 918 is asserted to transfer DC power 905 to charge the battery module 919 in battery slot 920 when the energy in battery module 919 being detected by a charging comparator 912 is saturated to a logic low. That is the charging of battery module 919 will take place when an attenuated voltage VBATT derived from the voltage divider R1, R2, which is coupled to the output of battery module 919, being detected by comparator 912 is below the charging threshold voltage Vrefc. The other output at AND 916 generates an enable output signal NXCEN1 as input to the charging demultiplexer in control section 930A of the succeeding control switch 930, when energy in battery module 919 becomes fully charged, i.e. when the attenuated voltage VBATT derived from the output of battery module 919 being detected by comparator 912 reaches the charging reference voltage Vrefc.

Similarly, a discharging comparator 922 compares the attenuated voltage VBATT with a discharging reference voltage Vrefd. The battery module will stop discharging its energy when the VBATT input to comparator 922 falls below Vrefd. The external DC power 905 will stop charging battery module 919 when the input to comparator 912 reaches Vrefc. Voltage Vrefc is higher than voltage Vrefd.

When the discharging enable input signal DEN1 is enabled, and if the discharging comparator 922 output is saturated to a logic high, indicating that the battery module 919 has sufficient energy for output, the DISCHARGE1 control signal is asserted by the discharging demultiplexer 925 at one of its outputs at AND 927 to close, for example, a normally-open single-pole, single-throw (SPST) switch 928, shown as being coupled to the output of battery module 919. However, if the discharging comparator 922 is saturated to a logic low level, indicating that energy in the battery module 919 is depleted or does not have sufficient charge, then the other output at AND 926 is asserted to enable the discharging demultiplexer in control section 930A of the succeeding control switch 930.

Each battery slot in the battery charging and discharging system 900 includes a presence detection switch, such as a normally-closed direct contact limit switch 923 in the battery slot 920 coupled to control switch 910, to detect the presence of battery module in the slot. If, for example, without a battery module in the slot 920, the direct contact limit switch 923 will be output high to inhibit the control switch 910, where the charging control and the discharging control at control switch 910 will be switched over to the charging demultiplexer and the discharging demultiplexer in a succeeding control switch 930. Similarly, any abnormality taking place in a control switch will also cause the charging control and the discharging control in control switch to switch over to a succeeding control switch.

When a battery module is properly positioned in the battery slot, the pull-down resistor, such as the R7 coupled to the direct contact limit switch 923, will negate the INHIBIT input to associated control switch for the control switch to operate normally.

Either the assertion of a parallel charging enable input signal PCEN or the assertion of a sequential charging enable input signal SCENx enables charging demultiplexer in control switch to proceed the charging function. The parallel charging enable input signal suppresses the sequential charging operation among the control switches connecting to the parallel charging enable input signal. Similarly, either the assertion of a parallel discharging enable input signal PDEN or the assertion of a sequential discharging enable input signal SDENx enables discharging demultiplexer in control switch to proceed the discharging function. Similarly, the parallel discharging enable input signal suppresses the sequential discharging operation among the control switches connecting to the parallel discharging enable input. The sequential charging control chain 901 controls the sequential charging of all battery modules in the system 900 and the sequential discharging control chain 902 controls the sequential discharging of the same set of battery modules in the system 900. A parallel discharging would increase the output current from the battery system accordingly.

Both charging and discharging control chains operate independently. However, if there is a sufficient energy in DC power source 905 being detected by the comparator 909 and if transfer device is enabled to charge a battery module, then a concurrent assertion of the enable input signals to both the charging demultiplexer and to the discharging demultiplexer will cause the DC power source 905 directly output to VOUT. A DC-DC converter may be coupled to the VOUT of the battery modules to ensure a consistent DC voltage output.

The control section and the transfer section of a control switch may be integrated in a single chip to minimize device count. Alternatively, the transfer device in the transfer section of a charging and discharging control switch may be separate from its control section so that a proper transfer device may be chosen to meet different power requirement. The control switch may also be implemented using discrete devices. It is the output of the charging comparator, e.g. 912, in control switch 910 is connected to the STATUS output of the control switch to indicate whether battery module 929 is fully charged.

Figure 10:
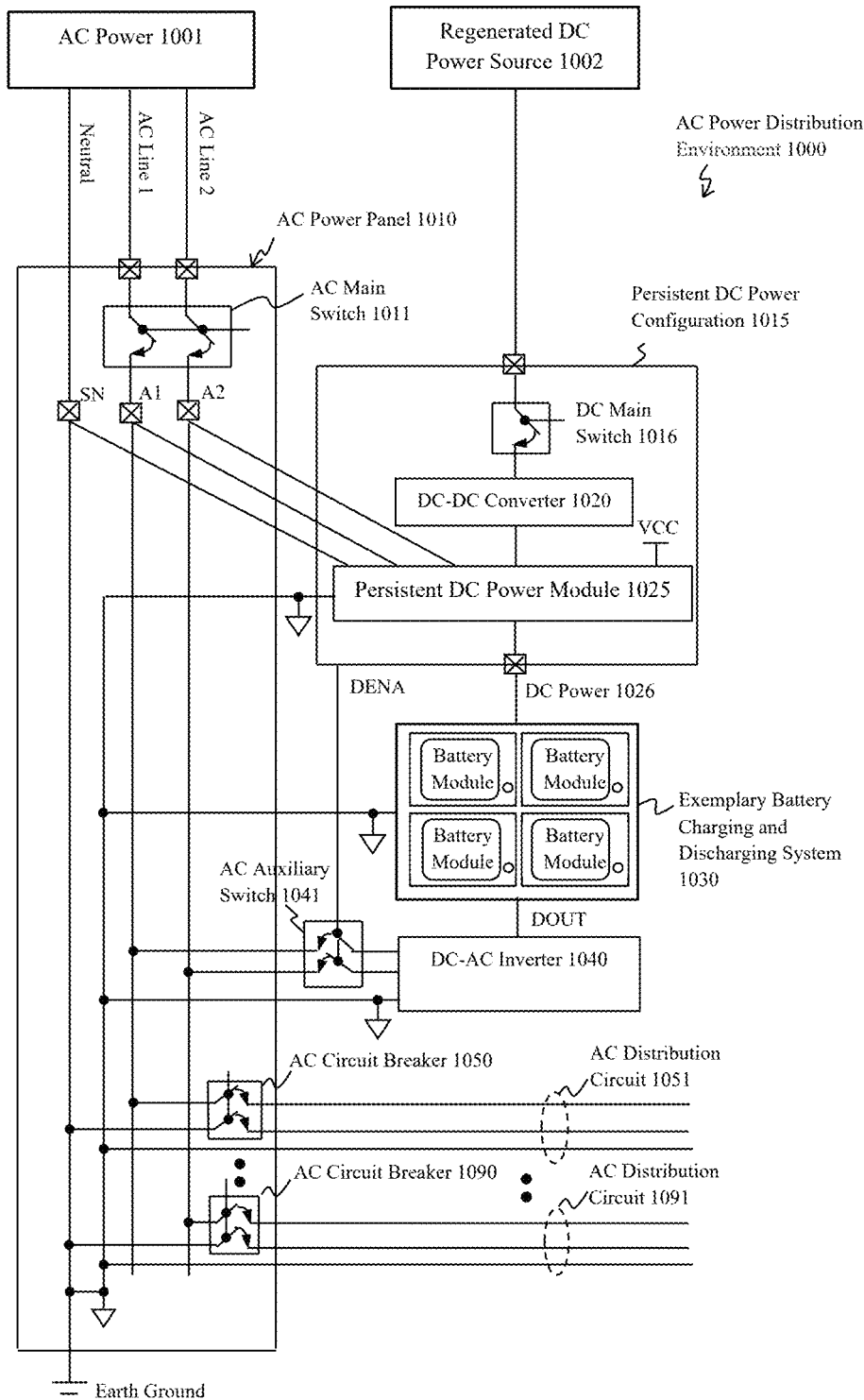
FIG. 10 illustrates an exemplary swappable battery charging and discharging system in an AC power distribution environment, in accordance with one embodiment of the present disclosure.

FIG. 10 is a schematic diagram of an exemplary swappable battery module charging and discharging system 1030 coupled to an AC power panel 1010 to provide AC power for a set of AC power distribution circuits 1051 . . . 1091 in an AC power distribution environment 1000, in accordance with one embodiment of the present disclosure. Swappable battery module charging and discharging system 1030 is shown, in part, as being coupled to a persistent DC power configuration 1015, which includes a DC main switch 1016 to enable a regenerated DC power source 1002, such as solar panels, as input to a DC-DC converter 1020, before being input to a persistent DC power module 1025. When the regenerated DC power source becomes unavailable, the persistent DC power configuration 1015 is switched to source power from the AC power source 1001. The persistent DC power module 1025 outputs a DC power 1026 to the battery charging and discharging system 1030, whose output DOUT is input to a DC-to-AC inverter 1040 to generate an AC power for use by the AC power panel 1010. The battery module in the slot of the battery system 1030 is removable to swap with the battery module in other battery system, such as in EV, after being charged.

The AC power source 1001, through an AC main switch 1011, powers the AC power panel 1010, where a multitude of AC circuit breakers 1050, . . . , 1090 are coupled to a plurality of AC power distribution circuits 1051, . . . , 1091 respectively. In case of an AC power outage, the energy stored in the battery modules of system 1030 may be supplied to AC power panel 1010 for use. A DC-AC inverter 1040 with input connected to the discharged DC output DOUT from the battery system 1030 can invert the stored DC power into AC power with a normally-open AC auxiliary switch 1041 closed to provide the inverted AC to the two hot lines of the AC power. For a large battery charging and discharging system, the stored energy may be fed to an AC power grid. The persistent DC power module 1025, which receives and monitors AC power source 1001, asserts a DC enable output signal DENA to enable the output of DC-AC inverter 1040 when the AC power source 1001 becomes unavailable.

Figure 11:
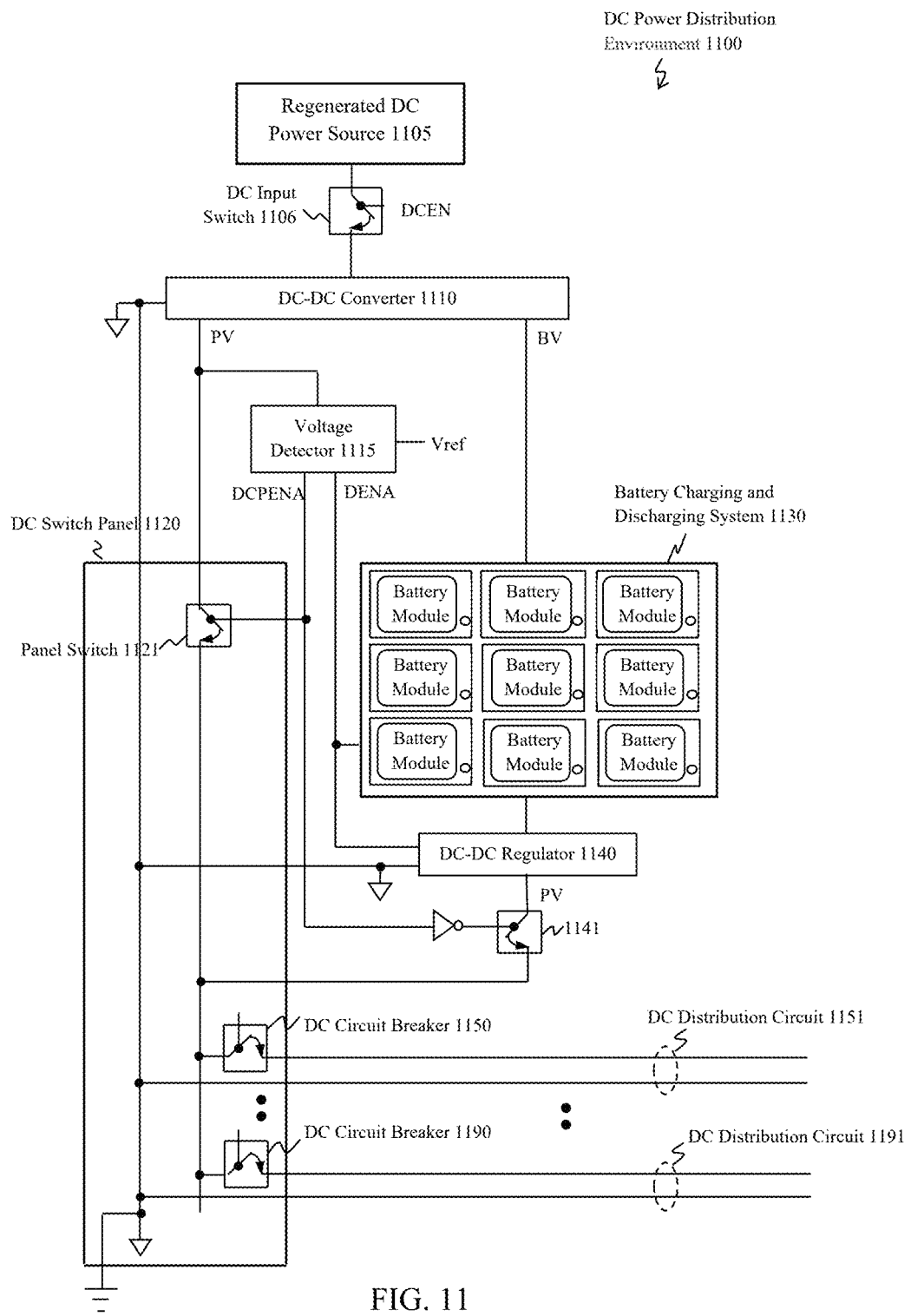
FIG. 11 illustrates an exemplary swappable battery charging and discharging system in a DC power distribution environment, in accordance with one embodiment of the present disclosure.

FIG. 11 is a schematic diagram of an exemplary swappable battery module charging and discharging system in a DC power distribution environment 1100. A regenerated DC power source 1105, gated by a DC input switch 1106 controlled by DCEN, is input to a DC-DC converter 1110 to generate two converted outputs, where one output is a panel voltage PV for the DC power switch panel 1120 to use. The other output is a battery voltage BV for charging the battery modules in a battery charging and discharging system 1130, as described in detail above. The BV energy charges swappable battery modules in battery slots when there is sufficient energy from the regenerated DC power source 1105.

Voltage detector 1115 detects the converted voltage PV to generate two control signals. One control signal is a DC panel enable signal DCPENA, which is asserted when the converted voltage PV is sufficiently high. The assertion of signal DCPENA closes the panel switch 1121 to source PV to DC circuit breakers 1150, . . . , 1190, disposed in the DC switch panel 1120, to power DC distribution circuits 1151, . . . , 1191 respectively, whereas a normally-open switch 1141 at the output of DC-DC converter 1140 being coupled to the battery system 1130 remains open.

The other control signal generated by the voltage detector 1115 is a discharging enable signal DENA. When the converted voltage PV drops below a threshold level Vref, a low at DCPENA control signal causes the panel switch 1121 to open and the switch 1141 to close, thereby enabling the voltage PV generated by the DC-DC converter 1140 to power the DC switch panel 1120 instead. When the discharging enable signal DENA is asserted, it may enable both the battery system 1130 and the DC-DC converter 1140. The DENA signal could be asserted prior to the negation of DCPENA for the PV output from DC-DC regulator 1140 to be ready in advance for use by the DC switch panel 1120.

The voltage used in the EV battery and the voltage used in a DC power distribution circuit may be different. Thus, the DC-DC converter 1110 may generate two converted outputs at different voltage to meet such a need.

The battery charging and discharging system is a hardware-based system with minimal software/firmware requirement for the charging and the discharging control of the system. The hardware approach to control the charging and discharging of a plurality of swappable battery modules without the use of microcontroller or computer minimizes the complexity in configuring a battery charging and discharging system, and potentially at a lower cost, to make it more attractive for general use.

The system is scalable. Its configuration can be expanded by adding more battery slots and linking the control switches associated with respective slots sequentially. Its configuration may be shrunk by simply removing one or more battery slots from the system. The changes in the configuration and in the size of the system can be readily achieved without a system software reconfiguration or re-boot, thereby avoiding complications and malware attack. The geometry of the swappable battery modules and the matching battery slots may be configured to have circular, rectangular, square or other cross section that meets the space constraint, space utilization, holding stability, and accessibility in a battery system. The system is configurable to accommodate space constraint. The swappable battery modules may be positioned in the battery slots or butted together in the system. Users may choose a charging only solution or a charging and discharging solution, depending upon their needs.

Status indicator, such as an external LED or a display panel, may be coupled to the STATUS output of the control switch to indicate the energy status of battery modules in battery slots. When no battery module is in the slot, the pull-down resistor of the voltage divider circuitry coupled to the power contact of battery slot applies a zero voltage to the comparator input, thus deactivating the status indictor.

A battery charging and discharging system, in accordance with embodiments of the present disclosure has a number of advantages. For example, when such a system is installed at home or in an apartment complex, multiple EVs may share the same battery charging system without the need to install multiple chargers. The battery system may also deliver battery energy for use in case of a power outage, where the battery modules are compatible for home and EV use.

When the swappable battery modules are used, for example, by an EV and controlled by a sequential charging control chain with a parallel charging function, as described above, then the set of battery modules may be charged not only by a fast charger in parallel, such as a level-3 charger, but also by a less powerful charger sequentially, such as an in-situ regenerated energy or a charger at home, simply to charge the energy depleted battery modules and to skip the battery modules that have been fully charged. The swappable battery modules, if desired, may be swapped at a battery station when their energy is depleted. If the swappable battery modules in, for example, an EV are also controlled by a sequential charging control chain for battery charging, then the energy depleted battery modules in EV may be directly charged by a charger connected to the sequential control chain without a need to remove the energy depleted battery modules from EV to swap with the fully charged battery modules from the battery charging system.

What is claimed is:

1. A system configured to charge a plurality of battery modules in a plurality of battery slots, wherein a first one of the plurality of battery slots comprises:
   a receptacle adapted to couple to a battery module;
   a detector adapted to detect a presence of the battery module at the receptacle; and
   a charging control unit comprising:
      a charging comparator adapted to monitor an energy level of the battery module;
      a charging input enable signal to enable a charging demultiplexer disposed in the charging control unit; and
      a charging-enable output signal generated by the charging demultiplexer, wherein when the charging input enable signal is asserted, the charging demultiplexer is adapted to:
         activate a transfer device disposed in the system to transfer energy from a DC power source to charge the battery module when the energy level detected by the charging comparator is below a charging reference voltage, and
         assert the charging-enable output signal to activate a charging control unit at a succeeding one of the plurality of battery slots when the energy level detected by the charging comparator reaches the charging reference voltage.

2. The system of claim 1, wherein the
   detector is a direct contact limit switch, which
   is normally-closed to output a high value to inhibit the charging control unit when the battery module is not present in the battery slot; and
   is open when the battery module is in the battery slot, wherein a pulled-down resistor attached at output of the direct contact limit switch negates inhibit input to the charging control unit.

3. The system of claim 1, wherein the charging control unit and the transfer device form a charging control switch.

4. The system of claim 1, wherein the charging-enable output signal of a $(k-1)^{th}$ charging control unit associated with a $(k-1)^{th}$ one of the plurality of battery slots and the charging input enable signal of a $k^{th}$ charging control unit associated with a $k^{th}$ one of the plurality of battery slots are linked to form a sequential charging control chain in the system, wherein k is an integer greater than or equal to 2, wherein the $(k-1)^{th}$ charging control unit has a higher priority to perform charging than the $k^{th}$ charging control unit in the sequential charging control chain.

5. The system of claim 4, wherein the sequential charging control chain controls sequential charging of the plurality of battery modules whose energy levels are below the charging reference voltage, in accordance with a linking sequence of the charging control units at the sequential charging control chain associated with the plurality of battery slots, when the sequential charging control chain is enabled.

6. The system of claim 1, further comprising a comparator adapted to monitor availability of the DC power source for charging by comparing an attenuated voltage derived from the DC power source with the charging reference voltage.

7. The system of claim 5 wherein the system is adaptive to reconfigure the charging control chain automatically on a rearrangement of the plurality battery slots in the system, including one or more of:
re-ordering the linking sequence of the plurality of battery slots;
increasing a number of the plurality of battery slots; and
reducing a number of the plurality of battery slots.

8. The system of claim 1, wherein a parallel charging enable signal is ORed with the charging input enable signal to generate a combined signal adapted to enable the charging demultiplexer in the charging control unit.

9. The system of claim 8, wherein the parallel charging enable signal is adapted to enable one or more charging control units associated with the plurality of battery slots to charge one or more battery modules disposed in one or more battery slots in parallel, wherein the DC power source is distributed to one or more charging control units.

10. The system of claim 7, wherein the charging control chain is partitioned into one or more charging segments, wherein
a segment charging input enable signal is applied to the charging input enable terminal of the charging control units in a charging segment in parallel; and
a segment charging-enable output signal is generated by ANDing the charging-enable output signals of the charging control units in the charging segment to enable a succeeding charging segment in the charging control chain of the system.

11. A system configured to discharge a plurality of battery modules in a plurality of battery slots, wherein a first one of the plurality of battery slots comprises:
a receptacle adapted to couple to a battery module;
a detector adapted to detect a presence of the battery module at the receptacle; and
a discharging control unit, comprising:
a discharging comparator to monitor the energy level of the battery module;
a discharging input enable signal adapted to enable a discharging demultiplexer disposed in the discharging control unit; and
a discharging-enable output signal generated by the discharging demultiplexer, wherein when the discharging input enable signal is asserted, the discharging demultiplexer is adapted to:
activate closure of a normally-open switch coupled to an output of the battery module to deliver energy for external use, when the discharging comparator detects energy level in the battery module above a discharging reference voltage; and
assert the discharging-enable output signal to activate a discharging control unit at a succeeding one of the plurality of battery slots, when the discharging comparator detects energy level in the battery module is below the discharging reference voltage.

12. The system of claim 11, wherein the detector is a direct contact limit switch, which
is normally-closed to output a high value to inhibit the discharging control unit when the battery module is not in the battery slot; and
is open when the battery module is in the battery slot, wherein a pulled down resistor attached to output of the direct contact limit switch negates inhibit input to the discharging control unit.

13. The system of claim 11, wherein the the detector to detect presence of the battery module coupled to the receptacle includes one of following:
direct contact limit switch;
capacitance sensor;
electrostatic sensor;
magnetic sensor; and
optical sensor.

14. The system of claim 11, wherein the discharging control and the transfer device form a discharging control switch.

15. The system of claim 11, wherein the discharging control unit and the transfer device form a discharging control switch.

16. The system of claim 11, wherein the discharging-enable output signal of a $(k-1)^{th}$ discharging control unit associated with a $(k-1)^{th}$ one of the plurality of battery slots and the discharging input enable signal of a $k^{th}$ discharging control unit associated with a $k^{th}$ one of the plurality of battery slots are linked to form a sequential discharging control chain in the system, wherein k is an integer greater than or equal to 2, wherein a preceding discharging control unit has a higher priority to discharge a battery module designated as a higher priority than a succeeding discharging control unit to discharge a battery module designated as a lower priority in the sequential discharging control chain.

17. The system of claim 16, wherein the sequential discharging control chain controls discharging of the plurality of battery modules sequentially in accordance with a linking sequence of the discharging control units forming the discharging control chain associated with the plurality of battery slots.

18. The system of claim 17, wherein the sequential discharging control chain controls sequential discharging of the plurality of battery modules whose energy levels are above the discharging reference voltage automatically, when the discharging control chain is enabled.

19. The system of claim 17 wherein the system is adaptive to reconfigure the discharging control chain automatically on a rearrangement of the plurality battery slots in the system, including one or more of:
re-ordering the linking sequence of the plurality of battery slots;
increasing a number of the plurality of battery slots; and
reducing a number of the plurality of battery slots.

20. The system of claim 11, wherein a parallel discharging enable signal is ORed with the discharging input enable signal to generate a combined signal adapted to enable the discharging demultiplexer in the discharging control unit.

21. The system of claim 20, wherein assertion of the parallel discharging enable signal enables one or more discharging control units associated with the plurality of battery slots to discharge energy from battery modules disposed in one or more battery slots in parallel, wherein discharging more than one battery modules in parallel increases output energy of the system.

22. The system of claim 19, wherein the discharging control chain is partitioned into one or more discharging segments, wherein
a segment discharging input enable signal is applied to the discharging input enable terminal of the discharging control units in a discharging segment in parallel; and
a segment discharging-enable output signal is generated by ANDing the discharging-enable output signals of the discharging control units in the discharging segment to enable a succeeding discharging segment in the discharging control chain of the system.

23. An energy storage system configured to charge and discharge a plurality of battery modules in a plurality of battery slots, wherein a first one of the plurality of battery slots comprises:
- a receptacle adapted to couple to a battery module;
- a detector adapted to detect a presence of the battery module at the receptacle; and
- a charging control unit comprising:
  - a charging comparator adapted to monitor an energy level of the battery module;
  - a charging input enable signal to enable a charging demultiplexer disposed in the charging control unit; and
  - a charging-enable output signal generated by the charging demultiplexer, wherein when the charging input enable signal is asserted, the charging demultiplexer is adapted to:
    - activate a transfer device disposed in the energy storage system to transfer energy from a DC power source to charge the battery module when the energy level detected by the charging comparator is below a charging reference voltage, and
    - assert the charging-enable output signal to activate a succeeding charging control unit at a succeeding one of the plurality of battery slots when the energy level detected by the charging comparator reaches the charging reference voltage; and
- a discharging control unit comprising:
  - a discharging comparator adapted to monitor the energy level of the battery module;
  - a discharging input enable signal adapted to enable a discharging demultiplexer disposed in the discharging control unit; and
  - a discharging-enable output signal generated by the discharging demultiplexer, wherein when the discharging input enable signal is asserted, the discharging demultiplexer is adapted to:
    - activate closure of a normally-open switch coupled to an output of the battery module to deliver energy for external use, when the discharging comparator detects energy level in the battery module is above a discharging reference voltage; and
    - assert the discharging-enable output signal to activate a succeeding discharging control unit at the succeeding one of the plurality of battery slots, when the discharging comparator detects energy level in the battery module is below the discharging reference voltage.

24. The energy storage system of claim 23, wherein the charging reference voltage is a first attenuated voltage derived from an output of the battery module and the discharging reference voltage is a second attenuated voltage derived from the output of the battery module.

25. The energy storage system of claim 23, wherein the charging reference voltage is higher than the discharging reference voltage.

26. The energy storage system of claim 23, wherein a power comparator being adapted to compare an attenuated DC power input voltage with the charging reference voltage to activate the charging demultiplexer.

27. The energy storage system of claim 23, wherein the charging control unit in the first one of the plurality of battery slots is linked with a second charging control unit in a second one of the plurality of battery slots to form a charging control chain to control charging of the plurality of battery modules in the plurality of battery slots sequentially; and
- the discharging control unit in the first one of the plurality of battery slots is linked with a second discharging control unit in the second one of the plurality of battery slots to form a discharging control chain to control discharging of the plurality of battery modules in the plurality of battery slots sequentially.

28. The energy storage system of claim 27, wherein the charging control chain and discharging control chain are enabled to charge and discharge energy in the plurality of battery modules independently.

29. The energy storage system of claim 23, wherein the detector to detect presence of the battery module coupled to the receptacle includes one of following:
- a direct contact limit switch;
- a capacitance sensor;
- an electrostatic sensor;
- a magnetic sensor; and
- an optical sensor.

30. The energy storage system of claim 29, wherein the direct contact limit switch
- is normally-closed to output a high value to inhibit the charging control unit and the discharging control unit when the battery module is not in the battery slot; and
- is open when the battery module is in the battery slot, wherein a pulled down resistor attached to output of the direct contact limit switch negates inhibit input to the charging control unit and the discharging control unit.

\* \* \* \* \*